(12) United States Patent
Zhang et al.

(10) Patent No.: US 11,483,852 B2
(45) Date of Patent: Oct. 25, 2022

(54) TECHNIQUES FOR HANDLING FEEDBACK FOR DOWNLINK TRANSMISSIONS IN A SHARED RADIO FREQUENCY SPECTRUM BAND

(71) Applicant: QUALCOMM Incorporated, San Diego, CA (US)

(72) Inventors: Xiaoxia Zhang, San Diego, CA (US); Tao Luo, San Diego, CA (US); Arumugam Chendamarai Kannan, San Diego, CA (US); Zhengwei Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 16/848,598

(22) Filed: Apr. 14, 2020

(65) Prior Publication Data

US 2020/0245349 A1 Jul. 30, 2020

Related U.S. Application Data

(62) Division of application No. 15/164,837, filed on May 25, 2016, now Pat. No. 10,652,921.
(Continued)

(51) Int. Cl.
*H04W 72/12* (2009.01)
*H04B 17/309* (2015.01)
(Continued)

(52) U.S. Cl.
CPC ...... *H04W 72/1273* (2013.01); *H04B 7/0626* (2013.01); *H04B 17/309* (2015.01);
(Continued)

(58) Field of Classification Search
None
See application file for complete search history.

(56) References Cited

U.S. PATENT DOCUMENTS 7,548,752 B2 6/2009 Sampath et al.
7,602,843 B2 10/2009 Cho et al.
(Continued)

FOREIGN PATENT DOCUMENTS

CN 104333896 A 2/2015
EP 2160054 A1 3/2010
(Continued)

OTHER PUBLICATIONS

De Lima C.H.M., et al., "Outer-Loop Power Control Based on Hybrid ARQ Protocol for WCDMA Enhanced Uplink", IEEE, Sep. 2006, pp. 682-687.
(Continued)

*Primary Examiner* — Ayaz R Sheikh
*Assistant Examiner* — Faiyazkhan Ghafoerkhan
(74) *Attorney, Agent, or Firm* — Holland & Hart LLP

(57) ABSTRACT

Techniques are described for wireless communication. A first method may include classifying feedback received for a first downlink transmission over a shared radio frequency spectrum band; identifying an interference parameter for a subsequent downlink transmission; and scheduling the subsequent downlink transmission based at least in part on feedback classified in a feedback category associated with the identified interference parameter for the subsequent downlink transmission. The feedback may be classified in one of a plurality of feedback categories, and the classifying may be based at least in part on an interference parameter for the first downlink transmission. A second method may include identifying an interference parameter for a first downlink transmission received over a shared radio fre-
(Continued)

quency spectrum band; generating feedback for the first downlink transmission; and sending, to a base station, the feedback along with an indication of the interference parameter.

17 Claims, 15 Drawing Sheets

Related U.S. Application Data

(60) Provisional application No. 62/167,077, filed on May 27, 2015.

(51) Int. Cl.
  *H04W 72/04*  (2009.01)
  *H04B 7/06*  (2006.01)
  *H04L 1/18*  (2006.01)
  *H04L 27/26*  (2006.01)
  *H04L 1/20*  (2006.01)
  *H04L 1/00*  (2006.01)
  *H04W 84/04*  (2009.01)

(52) U.S. Cl.
  CPC .......... *H04L 1/0026* (2013.01); *H04L 1/1812* (2013.01); *H04L 1/1887* (2013.01); *H04L 1/20* (2013.01); *H04L 27/2691* (2013.01); *H04W 72/042* (2013.01); *H04W 72/0453* (2013.01); *H04W 84/042* (2013.01)

(56) References Cited

U.S. PATENT DOCUMENTS

| | | | |
|---|---|---|---|
| 8,351,949 B2 | 1/2013 | Fu et al. | |
| 8,537,926 B2 | 9/2013 | Alapuranen | |
| 9,094,154 B2* | 7/2015 | Wilhelmsson | H04L 1/20 |
| 9,515,773 B2* | 12/2016 | Barbieri | H04W 24/10 |
| 10,652,921 B2* | 5/2020 | Zhang | H04L 1/0026 |
| 2003/0026369 A1 | 2/2003 | Murray et al. | |
| 2003/0073435 A1* | 4/2003 | Thompson | H04B 7/18513 455/1 |
| 2004/0147222 A1* | 7/2004 | Walsh | H04B 7/19 455/12.1 |
| 2008/0056201 A1* | 3/2008 | Bennett | H04W 28/18 455/562.1 |
| 2009/0047906 A1* | 2/2009 | Li | H04B 1/1027 455/63.1 |
| 2009/0264146 A1 | 10/2009 | Koo et al. | |
| 2010/0220675 A1 | 9/2010 | Chun et al. | |
| 2010/0232318 A1* | 9/2010 | Sarkar | H04W 24/02 370/254 |
| 2010/0323749 A1* | 12/2010 | Lee | H04W 36/28 455/524 |
| 2011/0151877 A1* | 6/2011 | Tafreshi | H04W 36/18 455/442 |
| 2011/0249643 A1* | 10/2011 | Barbieri | H04W 24/10 370/328 |
| 2011/0250919 A1* | 10/2011 | Barbieri | H04L 5/0057 455/509 |
| 2011/0317581 A1 | 12/2011 | Hoshino et al. | |
| 2012/0020257 A1* | 1/2012 | Urabe | H04W 74/0808 370/278 |
| 2012/0033643 A1 | 2/2012 | Noh et al. | |
| 2012/0076024 A1 | 3/2012 | Ko et al. | |
| 2012/0243431 A1* | 9/2012 | Chen | H04W 72/0406 370/252 |
| 2012/0281663 A1 | 11/2012 | Chen et al. | |
| 2012/0294179 A1* | 11/2012 | Tafreshi | H04W 36/18 370/252 |
| 2013/0021980 A1 | 1/2013 | Yang et al. | |
| 2013/0028225 A1 | 1/2013 | Ko et al. | |
| 2013/0137433 A1* | 5/2013 | Ahluwalia | H04W 72/0486 455/436 |
| 2014/0106801 A1* | 4/2014 | Tamizhmani | H04L 1/0033 455/501 |
| 2014/0204855 A1 | 7/2014 | Chun et al. | |
| 2014/0287792 A1* | 9/2014 | Rainisto | H04W 4/08 455/519 |
| 2015/0071370 A1* | 3/2015 | Wilhelmsson | H04L 1/0001 375/285 |
| 2015/0296456 A1* | 10/2015 | Kaikkonen | H04W 76/14 370/311 |
| 2016/0037425 A1 | 2/2016 | Van Lieshout et al. | |
| 2016/0037550 A1* | 2/2016 | Barabell | H04W 72/1263 455/450 |
| 2016/0050613 A1* | 2/2016 | Zhang | H04L 47/626 370/336 |
| 2016/0174201 A1 | 6/2016 | Zhang et al. | |
| 2016/0183308 A1* | 6/2016 | Eriksson | H04L 5/0055 370/329 |
| 2016/0242059 A1* | 8/2016 | Lopes | H04W 24/10 |
| 2016/0323177 A1* | 11/2016 | Tung | H04L 12/413 |
| 2016/0353474 A1* | 12/2016 | Zhang | H04L 27/2691 |
| 2016/0358195 A1 | 12/2016 | Klaczkow | |
| 2018/0352561 A1* | 12/2018 | Barabell | H04W 72/046 |
| 2020/0092901 A1* | 3/2020 | Barabell | H04W 72/046 |
| 2020/0245349 A1* | 7/2020 | Zhang | H04B 17/309 |

FOREIGN PATENT DOCUMENTS

| | | |
|---|---|---|
| KR | 20040047677 A | 6/2004 |
| KR | 20110114481 A | 10/2011 |
| WO | WO-2004049589 A1 | 6/2004 |
| WO | WO-2011130393 A1 | 10/2011 |
| WO | WO2015032440 A1 | 3/2015 |
| WO | WO-2015034944 A1 | 3/2015 |

OTHER PUBLICATIONS

International Preliminary Report on Patentability—PCT/US2016/034241, The International Bureau of WIPO—Geneva, Switzerland, Nov. 28, 2017.

International Search Report and Written Opinion—PCT/US2016/034241—ISA/EPO—dated Oct. 10, 2016.

Tang X., et al., "Multi-Cell User-Scheduling and Random Beamforming Strategies for Downlink Wireless Communications," IEEE 70th Vehicular Technology Conference Fall (VTC 2009-Fall), Sep. 2009, pp. 1-5.

* cited by examiner

TECHNIQUES FOR HANDLING FEEDBACK FOR DOWNLINK TRANSMISSIONS IN A SHARED RADIO FREQUENCY SPECTRUM BAND

CROSS REFERENCES

The present Application for Patent is a Divisional of U.S. patent application Ser. No. 15/164,837 by Zhang et al., entitled "Techniques For Handling Feedback For Downlink Transmissions in a Shared Radio Frequency Spectrum Band," filed May 25, 2016, which claims priority to U.S. Provisional Patent Application No. 62/167,077 by Zhang et al., entitled "Techniques for Handling Feedback for Downlink Transmissions in a Shared Radio Frequency Spectrum Band," filed May 27, 2015, each of which is assigned to the assignee hereof, and each of which is expressly incorporated by reference herein.

BACKGROUND

Field of the Disclosure

The present disclosure, for example, relates to wireless communication systems, and more particularly to techniques for handling feedback for downlink transmissions in a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UE). A base station may communicate with UEs on downlink channels (e.g., for transmissions from a base station to a UE) and uplink channels (e.g., for transmissions from a UE to a base station).

Some modes of communication may allow communication between a base station and a UE over a shared radio frequency spectrum band, or over different radio frequency spectrum bands (e.g., a dedicated radio frequency spectrum band and a shared radio frequency spectrum band) of a cellular network. With increasing data traffic in cellular networks that use a dedicated (e.g., licensed) radio frequency spectrum band, offloading of at least some data traffic to a shared radio frequency spectrum band may provide a cellular operator with opportunities for enhanced data transmission capacity. A shared radio frequency spectrum band may also provide service in areas where access to a dedicated radio frequency spectrum band is unavailable.

Prior to gaining access to, and communicating over, a shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the shared radio frequency spectrum band is available. When it is determined that the channel of the shared radio frequency spectrum band is available, a channel reservation signal (e.g., a channel usage beacon signal (CUBS)) may be transmitted to reserve the channel. If it is determined that the channel is not available, a CCA procedure may be performed for the channel again at a later time.

SUMMARY

When different base stations of a same public land mobile network (PLMN) transmit over a dedicated radio frequency spectrum band in parallel, the transmission frequency used by a first base station in a first cell may be reused by other base stations in other cells. The rate at which a same frequency may be used in a network is known as the frequency reuse rate. A Long Term Evolution (LTE) or LTE-Advanced (LTE-A) (LTE/LTE-A) network has a frequency reuse rate of one and operates in a "reuse one" mode. When different base stations of a same PLMN transmit or receive over a shared radio frequency spectrum band in parallel, the base stations may operate in a reuse one mode when their LBT radio frame timings are synchronized and all of the base stations win contention for access to the shared radio frequency spectrum band. When the LBT radio frame timings of the base stations are not synchronized, or when neighboring base stations do not all win contention for access to the shared radio frequency spectrum band, the base stations may operate in a time-domain multiplexed (TDM) mode instead of a reuse one mode. Because the interference environment for transmissions in a reuse one mode differ from the interference environment for transmissions in a TDM mode, the scheduling of downlink transmissions based on a combination of feedback received for transmissions in both interference environments may adversely impact the performance of downlink transmission scheduling. The techniques described in the present disclosure classify feedback received for downlink transmissions and schedule subsequent downlink transmissions based at least in part on feedback classified in feedback categories associated with interference parameters for the downlink transmissions.

In one example, a method for wireless communication at a base station is described. The method may include classifying feedback received for a first downlink transmission over a shared radio frequency spectrum band; identifying an interference parameter for a subsequent downlink transmission; and scheduling the subsequent downlink transmission based at least in part on feedback classified in a feedback category associated with the identified interference parameter for the subsequent downlink transmission. The feedback may be classified in one of a plurality of feedback categories, and the classifying may be based at least in part on an interference parameter for the first downlink transmission.

In some examples of the method, the interference parameter for the first downlink transmission may include one of transmission in a reuse one mode or transmission in a TDM mode. In some examples, classifying feedback received for the first downlink transmission may include classifying feedback received for the first downlink transmission in a first feedback category based at least in part on the interference parameter for the first downlink transmission including transmission of the first downlink transmission in the reuse one mode. In some examples, the method may include classifying feedback for a second downlink transmission in a second feedback category based at least in part on an interference parameter for the second downlink transmission including transmission of the second downlink transmission in the TDM mode.

In some examples of the method, the feedback may include channel state information (CSI), or acknowledgment/non-acknowledgment (ACK/NACK) feedback, or a combination thereof. In some examples, scheduling the subsequent downlink transmission may include selecting a modulation and coding scheme (MCS) for the subsequent downlink transmission. In some examples, the method may include identifying the interference parameter for the first downlink transmission. In some examples, identifying the interference parameter for the first downlink transmission may include receiving an indication of the interference parameter with the feedback for the first downlink transmission.

In some examples, identifying the interference parameter for the subsequent downlink transmission may include receiving a transmission status from at least one other base station and identifying the interference parameter for the subsequent downlink transmission based at least in part on the transmission status. In some examples, the base station and the at least one other base station may belong to a same PLMN. In some examples, receiving the transmission status may include receiving a channel usage beacon signal (CUBS), or a physical frame format indicator channel (PFFICH), or a combination thereof.

In some examples, the method may include maintaining, for each feedback category of the plurality of feedback categories, at least one of a separate hybrid automatic repeat request (HARQ) feedback outer loop or a separate CSI feedback outer loop, where the subsequent downlink transmission is scheduled based at least in part on one or both of a HARQ feedback outer loop and a CSI feedback outer loop associated with the feedback category associated with the interference parameter for the subsequent downlink transmission. In some examples, the method may include skipping, upon classifying the feedback received for the first downlink transmission in a first feedback category, at least one update of at least one of: a HARQ feedback outer loop associated with a second feedback category or a CSI feedback outer loop associated with the second category.

In one example, an apparatus for wireless communication at a base station is described. The apparatus may include means for classifying feedback received for a first downlink transmission over a shared radio frequency spectrum band, means for identifying an interference parameter for a subsequent downlink transmission, and means for scheduling the subsequent downlink transmission based at least in part on feedback classified in a feedback category associated with the identified interference parameter for the subsequent downlink transmission. The feedback may be classified in one of a plurality of feedback categories, and the classifying may be based at least in part on an interference parameter for the first downlink transmission.

In one example, another apparatus for wireless communication at a base station is described. The apparatus may include a processor and memory coupled to the processor. The processor may be configured to classify feedback received for a first downlink transmission over a shared radio frequency spectrum band, identify an interference parameter for a subsequent downlink transmission, and schedule the subsequent downlink transmission based at least in part on feedback classified in a feedback category associated with the identified interference parameter for the subsequent downlink transmission. The feedback may be classified in one of a plurality of feedback categories, and the classifying may be based at least in part on an interference parameter for the first downlink transmission.

In one example, a computer-readable medium for storing instructions executable by a processor is described. The instructions may include instructions to classify feedback received for a first downlink transmission over a shared radio frequency spectrum band, instructions to identify an interference parameter for a subsequent downlink transmission, and instructions to schedule the subsequent downlink transmission based at least in part on feedback classified in a feedback category associated with the identified interference parameter for the subsequent downlink transmission. The feedback may be classified in one of a plurality of feedback categories, and the classifying may be based at least in part on an interference parameter for the first downlink transmission.

In one example, a method for wireless communication at a UE is described. The method may include identifying an interference parameter for a first downlink transmission received over a shared radio frequency spectrum band, generating feedback for the first downlink transmission, and sending, to a base station, the feedback along with an indication of the interference parameter.

In some examples of the method, identifying the interference parameter may include receiving a transmission status from at least one neighboring base station, and identifying the interference parameter for the first downlink transmission based at least in part on the transmission status. In some examples, the method may include sending, to the base station with the feedback, the transmission status from the at least one neighboring base station. In some examples, identifying the interference parameter may include measuring a signal-to-noise ratio (SNR) associated with the first downlink transmission, and estimating the interference parameter for the first downlink transmission based at least in part on the measured SNR.

In one example, an apparatus for wireless communication at a UE is described. The apparatus may include means for identifying an interference parameter for a first downlink transmission received over a shared radio frequency spectrum band, means for generating feedback for the first downlink transmission, and means for sending, to a base station, the feedback along with an indication of the interference parameter.

In one example, another apparatus for wireless communication at a UE is described. The apparatus may include a processor and memory coupled to the processor. The processor may be configured to identify an interference parameter for a first downlink transmission received over a shared radio frequency spectrum band, generate feedback for the first downlink transmission, and send, to a base station, the feedback along with an indication of the interference parameter.

In one example, a computer-readable medium for storing instructions executable by a processor is described. The instructions may include instructions to identify an interference parameter for a first downlink transmission received over a shared radio frequency spectrum band, instructions to generate feedback for the first downlink transmission, and instructions to send, to a base station, the feedback along with an indication of the interference parameter.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
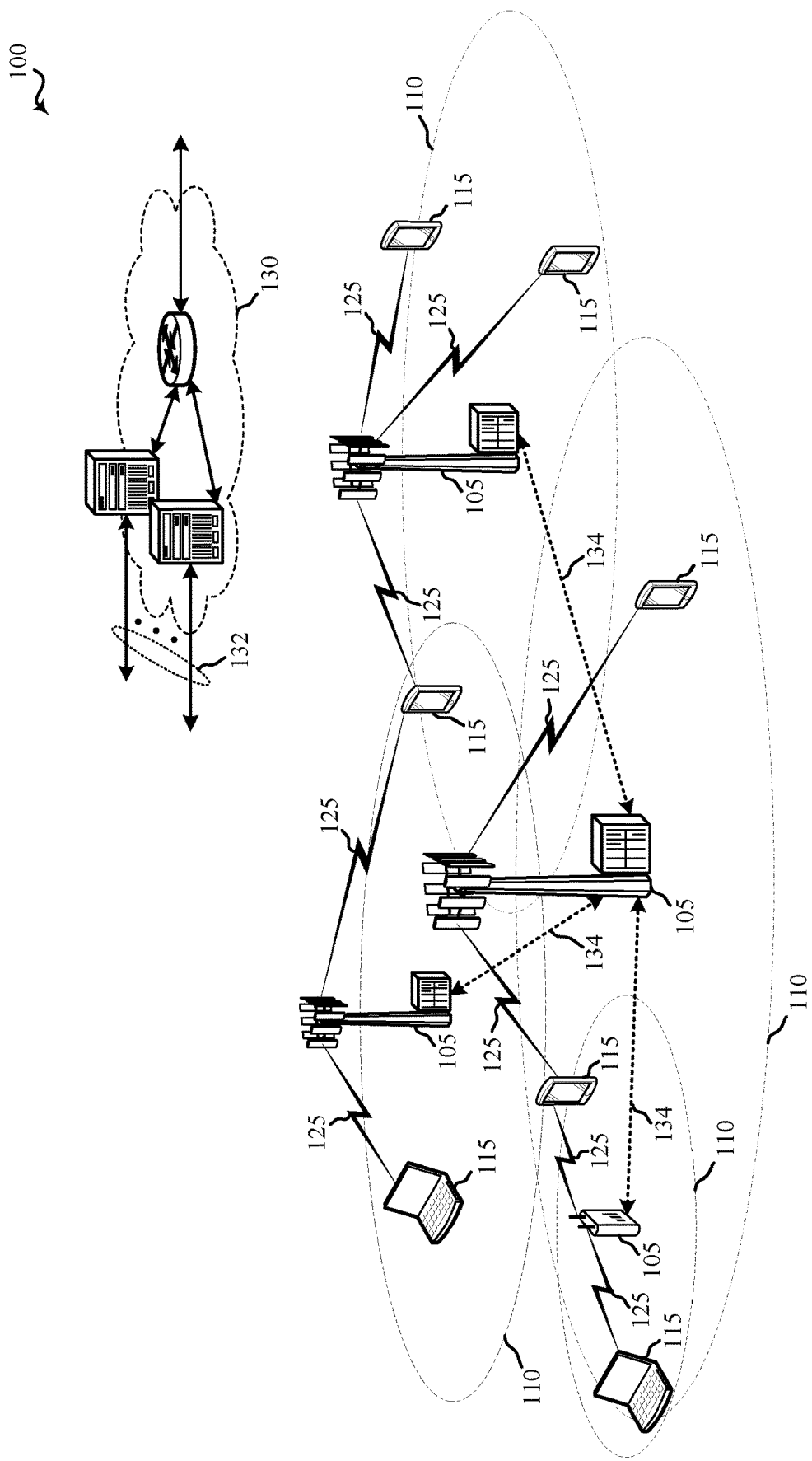
FIG. 1 illustrates an example of a wireless communication system, in accordance with various aspects of the disclosure.

The present disclosure generally relates to techniques for handling feedback for downlink transmissions in a shared radio frequency spectrum band. A base station may classify feedback received for a downlink transmission over a shared radio frequency spectrum band. The feedback may be classified in one of a plurality of feedback categories and may be based at least in part on an interference parameter for the first downlink transmission. The base station may also identify an interference parameter for a subsequent downlink transmission and schedule the subsequent downlink transmission based at least in part on feedback classified in a feedback category associated with the identified interference parameter for the subsequent downlink transmission.

Techniques are described in which a shared radio frequency spectrum band is used for at least a portion of communications over a wireless communication system. In some examples, the shared radio frequency spectrum band may be used for Long Term Evolution (LTE) or LTE-Advanced (LTE-A) (LTE/LTE-A) communications. The shared radio frequency spectrum band may be used in combination with, or independent from, a dedicated radio frequency spectrum band. The dedicated radio frequency spectrum band may be a radio frequency spectrum band for which transmitting apparatuses may not contend for access because the radio frequency spectrum band is licensed to particular users, such as a licensed radio frequency spectrum band usable for LTE/LTE-A communications. The shared radio frequency spectrum band may be a radio frequency spectrum band for which a device may contend for access (e.g., a radio frequency spectrum band that is available for unlicensed use, such as Wi-Fi use, or a radio frequency spectrum band that is available for use by multiple operators in an equally shared or prioritized manner).

With increasing data traffic in cellular networks that use a dedicated radio frequency spectrum band, offloading of at least some data traffic to a shared radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Use of a shared radio frequency spectrum band may also provide service in areas where access to a dedicated radio frequency spectrum band is unavailable. Before communicating over a shared radio frequency spectrum band, a transmitting apparatus may perform a Listen Before Talk (LBT) procedure to gain access to the medium. Such an LBT procedure may include performing a clear channel assessment (CCA) procedure (or extended CCA procedure) to determine whether a channel of the shared radio frequency spectrum band is available. When it is determined that the channel of the shared radio frequency spectrum band is available, a channel usage beacon signal (CUBS) may be broadcast to reserve the channel. In the case of a base station, indications of the downlink subframes and uplink subframes for which the channel is being reserved may also be broadcast. If it is determined that the channel is not available, a CCA procedure (or extended CCA procedure) may be performed for the channel again at a later time.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, a base station 105 may be referred to as a base transceiver station, a radio base station, an access point, a radio transceiver, a NodeB, an evolved Node B (eNB), eNodeB, a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term eNB may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a "3rd Generation Partnership Project" (3GPP) term that may be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid Automatic Repeat Request (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink transmissions, from a base station 105 to a UE 115, or uplink transmissions, from a UE 115 to a base station 105. The downlink transmissions may also be called forward link transmissions, while the uplink transmissions may also be called reverse link transmissions. The downlink transmissions may include, for example, a physical downlink shared channel (PDSCH), a physical downlink control channel (PDCCH; e.g., for transmission over a dedicated radio frequency spectrum band), an enhanced PDCCH (EPDCCH; e.g., for transmission over a shared radio frequency spectrum band), or a physical frame format indicator channel (PFFICH). In the case of time division duplexing (TDD) operation of the communication links 125, signaling on a PFFICH may indicate a TDD frame structure of communications over a communication link 125. The uplink transmissions may include, for example, a physical uplink shared channel (PUSCH) or a physical uplink control channel (PUCCH). The uplink transmissions may also include feedback (e.g., HARQ feedback) for the downlink transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a TDD operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation or dual-connectivity operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. In each communication direction, one CC may be configured as a primary cell (PCell), and the other CCs may be configured as secondary cells (SCells). Carrier aggregation may be used with both FDD and TDD component carriers.

In some examples, the wireless communication system 100 may support operation over a dedicated radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)).

Figure 2:
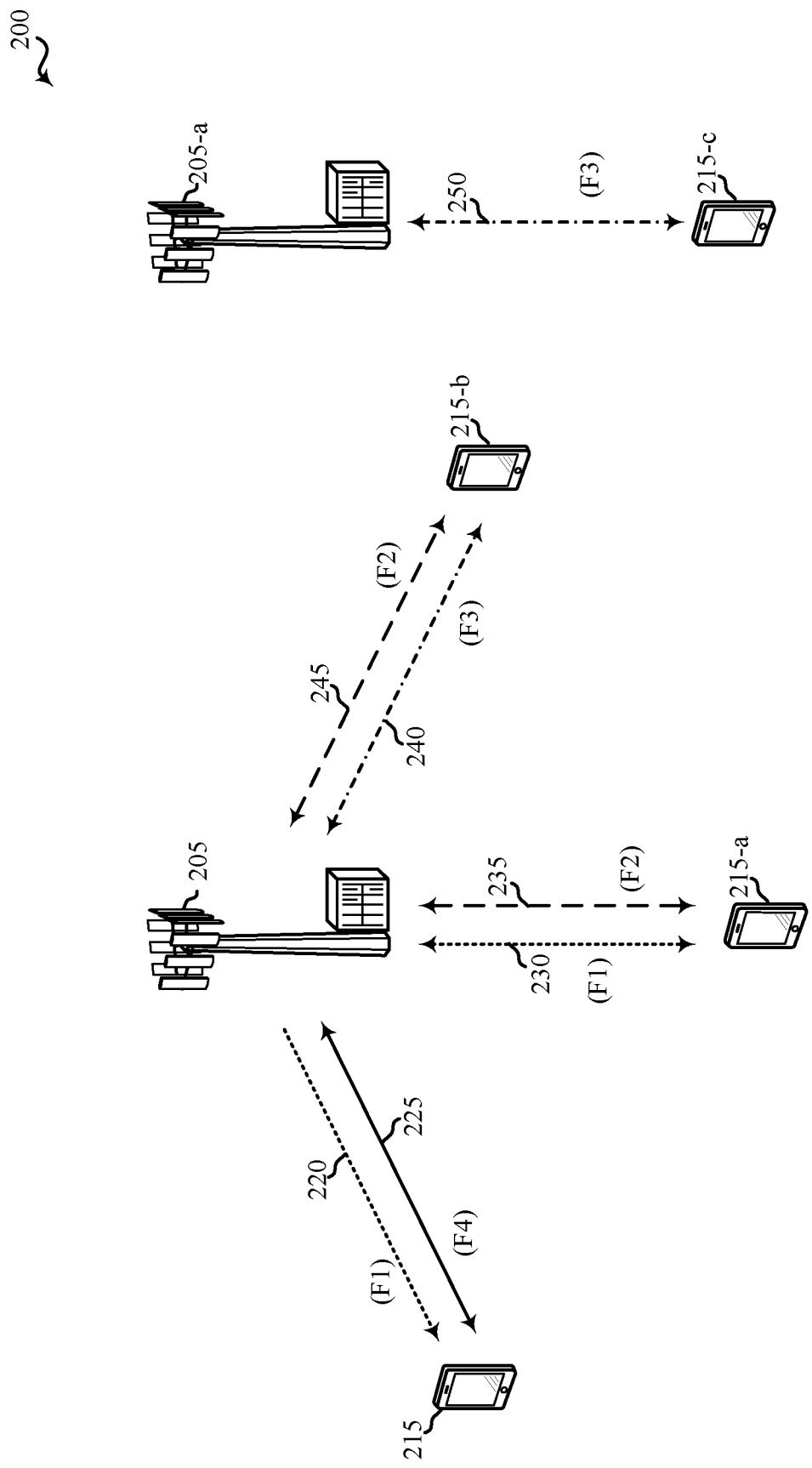
FIG. 2 shows a wireless communication system in which Long Term Evolution (LTE) or LTE-Advanced (LTE-A) (LTE/LTE-A) may be deployed under different scenarios using a shared radio frequency spectrum band, in accordance with various aspects of the present disclosure.

FIG. 2 shows a wireless communication system 200 in which LTE/LTE-A may be deployed under different scenarios using a shared radio frequency spectrum band, in accordance with various aspects of the present disclosure. More specifically, FIG. 2 illustrates examples of a supplemental downlink mode (also referred to as a licensed assisted access mode), a carrier aggregation mode, and a standalone mode in which LTE/LTE-A is deployed using a shared radio frequency spectrum band. The wireless communication system 200 may be an example of portions of the wireless communication system 100 described with reference to FIG. 1. Moreover, a first base station 205 and a second base station 205-*a* may be examples of aspects of one or more of the base stations 105 described with reference to FIG. 1, while a first UE 215, a second UE 215-*a*, a third UE 215-*b*, and a fourth UE 215-*c* may be examples of aspects of one or more of the UEs 115 described with reference to FIG. 1.

In the example of a supplemental downlink mode (e.g., a licensed assisted access (LAA) mode) in the wireless communication system 200, the first base station 205 may transmit Orthogonal Frequency-Division Multiple Access (OFDMA) waveforms to the first UE 215 using a downlink channel 220. The downlink channel 220 may be associated with a frequency F1 in a shared radio frequency spectrum band. The first base station 205 may transmit OFDMA waveforms to the first UE 215 using a first bidirectional link 225 and may receive single-carrier frequency-division multiple access (SC-FDMA) waveforms from the first UE 215 using the first bidirectional link 225. The first bidirectional link 225 may be associated with a frequency F4 in a dedicated radio frequency spectrum band. The downlink channel 220 in the shared radio frequency spectrum band and the first bidirectional link 225 in the dedicated radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a dedicated radio frequency spectrum band and needs to relieve some of the traffic or signaling congestion.

In one example of a carrier aggregation mode in the wireless communication system 200, the first base station 205 may transmit OFDMA waveforms to the second UE 215-*a* using a second bidirectional link 230 and may receive OFDMA waveforms, SC-FDMA waveforms, or resource block interleaved waveforms from the second UE 215-*a* using the second bidirectional link 230. The second bidirectional link 230 may be associated with the frequency F1 in the shared radio frequency spectrum band. The first base station 205 may also transmit OFDMA waveforms to the second UE 215-*a* using a third bidirectional link 235 and may receive SC-FDMA waveforms from the second UE 215-*a* using the third bidirectional link 235. The third bidirectional link 235 may be associated with a frequency F2 in a dedicated radio frequency spectrum band. The second bidirectional link 230 may provide a downlink and uplink capacity offload for the first base station 205. Like the supplemental downlink (e.g., the licensed assisted access mode) described above, this scenario may occur with any service provider (e.g., MNO) that uses a dedicated radio frequency spectrum band and needs to relieve some of the traffic or signaling congestion.

In another example of a carrier aggregation mode in the wireless communication system 200, the first base station 205 may transmit OFDMA waveforms to the third UE 215-*b* using a fourth bidirectional link 240 and may receive OFDMA waveforms, SC-FDMA waveforms, or resource block interleaved waveforms from the third UE 215-*b* using the fourth bidirectional link 240. The fourth bidirectional link 240 may be associated with a frequency F3 in the shared radio frequency spectrum band. The first base station 205 may also transmit OFDMA waveforms to the third UE 215-*b* using a fifth bidirectional link 245 and may receive SC-FDMA waveforms from the third UE 215-*b* using the fifth bidirectional link 245. The fifth bidirectional link 245 may be associated with the frequency F2 in the dedicated radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a dedicated radio frequency spectrum band and use a shared radio frequency spectrum band for capacity offload.

As described above, one type of service provider that may benefit from the capacity offload offered by using LTE/LTE-A in a shared radio frequency spectrum band is a traditional MNO having access rights to an LTE/LTE-A dedicated radio frequency spectrum band. For these service providers, an operational example may include a boot-strapped mode (e.g., supplemental downlink (e.g., LAA), carrier aggregation) that uses the LTE/LTE-A primary component carrier (PCC) on the dedicated radio frequency spectrum band and at least one secondary component carrier (SCC) on the shared radio frequency spectrum band.

In the carrier aggregation mode, data and control may, for example, be communicated in the dedicated radio frequency spectrum band (e.g., via first bidirectional link 225, third bidirectional link 235, and fifth bidirectional link 245) while data may, for example, be communicated in the shared radio frequency spectrum band (e.g., via second bidirectional link 230 and fourth bidirectional link 240). The carrier aggregation mechanisms supported when using a shared radio frequency spectrum band may fall under a hybrid FDD-TDD carrier aggregation or a TDD-TDD carrier aggregation with different symmetry across component carriers.

In one example of a standalone mode in the wireless communication system 200, the second base station 205-*a* may transmit OFDMA waveforms to the fourth UE 215-*c* using a bidirectional link 250 and may receive OFDMA waveforms, SC-FDMA waveforms, or resource block interleaved waveforms from the fourth UE 215-*c* using the bidirectional link 250. The bidirectional link 250 may be associated with the frequency F3 in the shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum band.

In some examples, a transmitting apparatus such as one of the base stations 105, 205, or 205-*a* described with reference to FIG. 1 or 2, or one of the UEs 115, 215, 215-*a*, 215-*b*, or 215-*c* described with reference to FIG. 1 or 2, may use a gating interval to gain access to a channel of a shared radio frequency spectrum band (e.g., to a physical channel of the shared radio frequency spectrum band). In some examples, the gating interval may be periodic. For example, the periodic gating interval may be synchronized with at least one boundary of a periodic radio frame structure (e.g., an LTE/LTE-A radio frame structure). The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a CCA procedure. The outcome of the CCA procedure may indicate to the transmitting apparatus whether a channel of a shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame. In some examples, the channel of the shared radio frequency spectrum band may be reserved by transmitting a CUBS over the shared radio frequency spectrum band.

Figure 3:
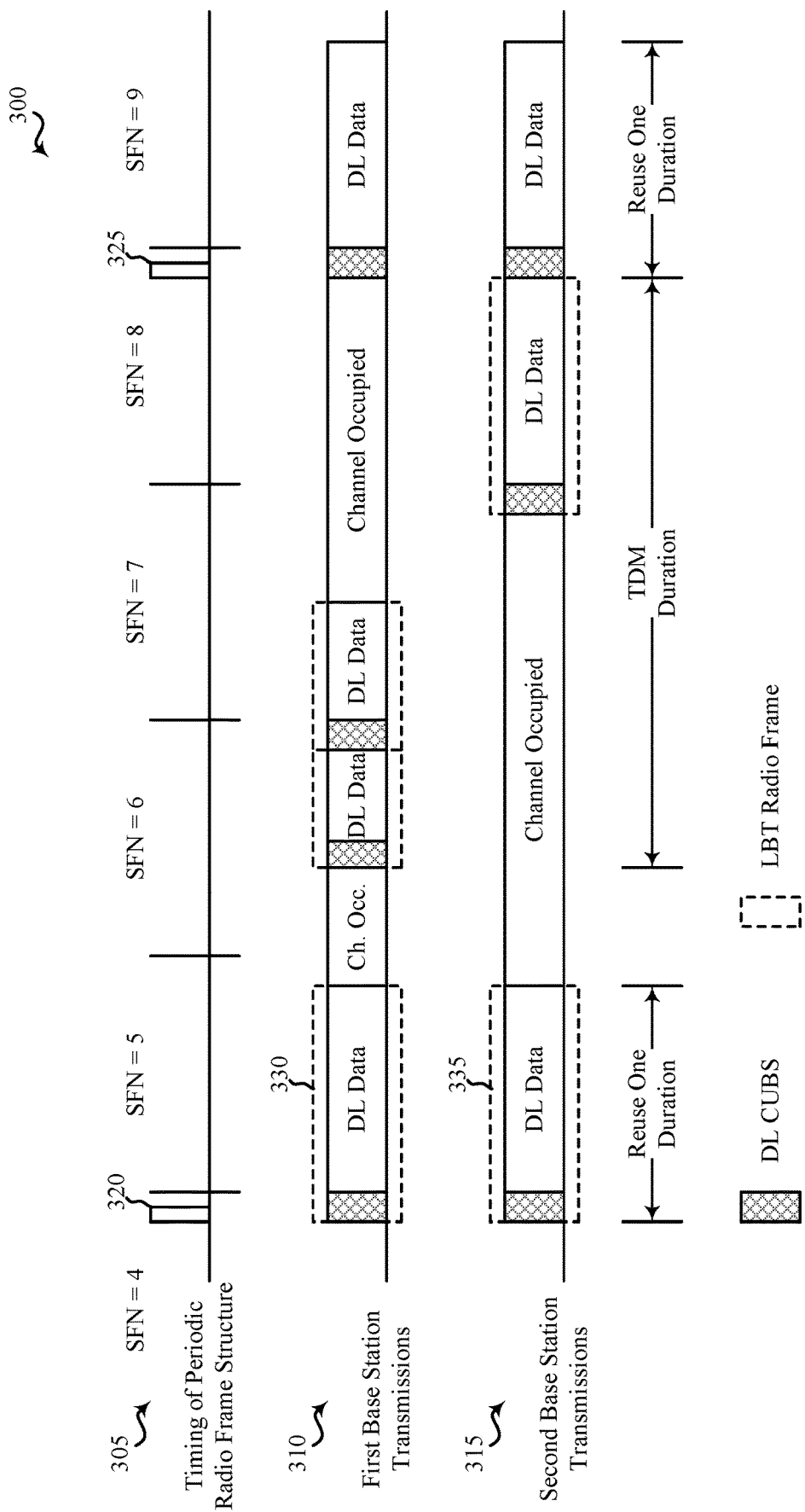
FIG. 3 shows a timing diagram of resynchronization operations for base stations communicating with user equipment (UEs) via a fixed listen before talk (LBT) radio frame structure, in accordance with various aspects of the present disclosure.

FIG. 3 shows a timing diagram 300 of resynchronization operations for base stations communicating with UEs via a fixed LBT radio frame structure (e.g., an LBT radio frame structure in which LBT radio frames are aligned with a periodic radio frame structure 305), in accordance with various aspects of the present disclosure. The base stations may be neighboring base stations of a same PLMN, and may be examples of aspects of the base stations 105, 205, or 205-*a* described with reference to FIG. 1 or 2. The UEs may likewise be examples of aspects of the UEs 115, 215, 215-*a*, 215-*b*, or 215-*c* described with reference to FIG. 1 or 2.

By way of example, FIG. 3 shows a timeline 310 of LBT radio frames transmitted by a first base station over a shared radio frequency spectrum band, and a timeline 315 of LBT radio frames transmitted by a second base station over a shared radio frequency spectrum band, in relation to a periodic radio frame structure 305 associated with a dedicated radio frequency spectrum band. The dedicated radio frequency spectrum band may be a radio frequency spectrum band for which transmitting apparatuses may not contend for access because the radio frequency spectrum band is licensed to particular users for particular uses (e.g., a licensed radio frequency spectrum band usable for LTE/LTE-A communications). The shared radio frequency spectrum band may be a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner).

The periodic radio frame structure 305 shown in FIG. 3 includes radio frames designated by system frame numbers (SFNs) 4, 5, 6, 7, 8, and 9. A resynchronization occasion is provided in each of SFN 4 and SFN 8 (e.g., a first resynchronization occasion 320 is provided in SFN 4, and a second resynchronization occasion 325 is provided in SFN 8).

During the first resynchronization occasion 320, the first base station and the second base station may resynchronize their LBT radio frame timings. After the resynchronization performed during the first resynchronization occasion 320, and when each of the first base station and the second base station have data to transmit or receive, each of the first base station and the second base station may contend for access to the shared radio frequency spectrum band. Because the first base station and the second base station belong to the same PLMN and are synchronized, the first base station and the second base station may both win or both lose contention for access to the shared radio frequency spectrum band. When the first base station and the second base station both win contention for access to the shared radio frequency spectrum band, each of the first base station and the second base station may transmit respective LBT radio frames (e.g., the first base station may transmit the first LBT radio frame 330, and the second base station may transmit the second LBT radio frame 335), at the same time, in a reuse one mode. When the first base station and the second base station both have data to transmit and are able to win contention for access to the shared radio frequency spectrum band for SFN 6, the first base station and the second base station may continue to operate in a reuse one mode. However, in the example shown in FIG. 3, neither the first base station nor the second base station is able to win contention for access to the shared radio frequency spectrum band at the beginning of SFN 6. Upon one or both of the first base station or the second base station failing to win contention for access to the shared radio frequency spectrum band (e.g., because of the activity of other devices using the shared radio frequency spectrum band in the vicinity of the first base station or the second base station), the first base station and the second base station may operate in a time domain multiplexed (TDM) mode with respect to accessing the shared radio frequency spectrum band.

By way of example, the first base station is shown to win contention for access to the shared radio frequency spectrum band partway through SFN 6, and again for SFN 7. In radio frames for which the first base station wins contention for access to the shared radio frequency spectrum band, the second base station may be prevented from winning contention for access to the shared radio frequency spectrum band. Likewise, in radio frames for which the second base station wins contention for access to the shared radio frequency spectrum band (e.g., in SFN 8), the first base station may be prevented from winning contention for access to the shared radio frequency spectrum band.

During the second resynchronization occasion 325, the first base station and the second base station may once again resynchronize their LBT radio frame timings and operate in a reuse one mode.

The switching of the first base station and the second base station between operation in a reuse one mode and operation in a TDM mode may affect the interference environments of the base stations. For example, when the first base station operates in a reuse one mode with respect to the second base station, downlink transmissions of the first base station may experience interference from transmissions of the second base station (and from other base stations within the same PLMN). However, when the first base station operates in a TDM mode with respect to the second base station, downlink transmissions of the first base station may not experience interference from transmissions of the second base station (or from other base stations within the same PLMN). These different interference environments may cause variations in the link quality of a UE associated with the first base station (e.g., CSI feedback and PDSCH decoding success/failure may vary).

If the first base station receives feedback on downlink transmissions from a UE and updates a HARQ outer feedback loop or CSI feedback outer loop of the first base station in response to the feedback, regardless of whether the feedback corresponds to a downlink transmission made in a reuse one mode or a TDM mode, the performance of the first base station may be adversely affected. For example, when feedback for a first downlink transmission made in a reuse one mode is used to update a HARQ outer feedback loop or a CSI outer feedback loop before scheduling a second downlink transmission that will be made in a TDM mode, the update of the HARQ outer feedback loop or the CSI outer feedback loop may result in a lower than supported MCS being used for the downlink transmission, which may result in decreased efficiency on the downlink as a result of unused link capacity. When feedback for a first downlink transmission made in a TDM mode is used to update a HARQ outer feedback loop or a CSI outer feedback loop before scheduling a second downlink transmission to be made in a reuse one mode, the update of the HARQ outer feedback loop or the CSI outer feedback loop may result in a higher than supported MCS or rank being used for the downlink transmission, which may result in decreased efficiency on the downlink as a result of a UE's failure to decode the second downlink transmission. The aforementioned decreases in efficiency may be mitigated, in some examples, by classifying feedback received for downlink transmissions based at least in part on interference parameters associated with the downlink transmissions, by identifying interference parameters for downlink transmissions, and by scheduling downlink transmissions based on feedback categories associated with the identified interference parameters for the downlink transmissions, as described for example with reference to FIG. 5, 6, 7, 8, 9, 12, 13, 14, or 15.

In some examples, a base station may receive multiple feedback signals associated with a downlink transmission from a UE. The multiple feedback signals may be transmitted by multiple UEs or from a single UE. In some instances, one or more of the multiple feedback signals may include an indication of the interference parameter associated with the downlink transmission. In other instances, the multiple signals may not include any information relating to the interference parameter or other parameters associated with the downlink transmission. In either case, the base station may then classify one or more of the multiple feedback signals based on an interference parameter, which may be determined by the base station or obtained from an indication transmitted by the UE. For example, the base station may classify a subset of the multiple feedback signals associated with a downlink transmission from a UE based on whether the feedback signal is associated with a downlink transmission made in a reuse one mode or in a TDM mode. After classifying, the base station may then schedule resources associated with a subsequent downlink transmission for the UE. In some cases, the base station may also update one or more of the HARQ outer feedback loop or the CSI outer feedback loop and the scheduling may involve determining an MCS for the subsequent downlink transmission based on the updated HARQ outer feedback loop or the updated CSI outer feedback loop. By classifying multiple feedback signals in this manner, a base station may be able schedule subsequent downlink transmissions for a UE based on whether the subsequent downlink transmission is to be made in a reuse one mode or a TDM mode, for example.

Figure 4:
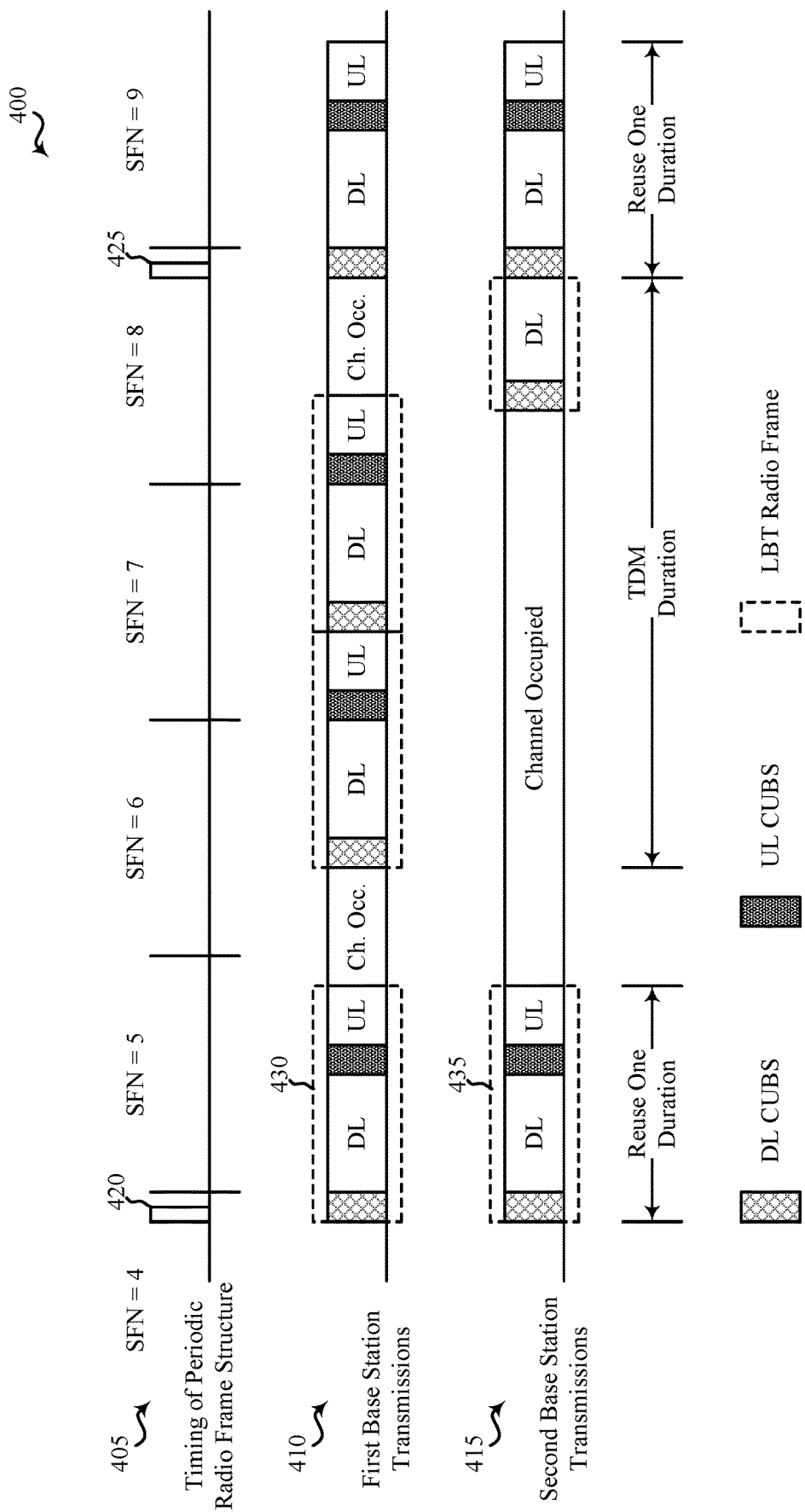
FIG. 4 shows a timing diagram of resynchronization operations for base stations communicating with UEs via a floating LBT radio frame structure, in accordance with various aspects of the present disclosure.

FIG. 4 shows a timing diagram 400 of resynchronization operations for base stations communicating with UEs via a floating LBT radio frame structure (e.g., an LBT radio frame structure in which LBT radio frames may not be aligned with a periodic radio frame structure 405), in accordance with various aspects of the present disclosure. The base stations may be neighboring base stations of a same PLMN, and may be examples of aspects of the base stations 105, 205, or 205-*a* described with reference to FIG. 1 or 2. The UEs may likewise be examples of aspects of the UEs 115, 215, 215-a, 215-b, or 215-c described with reference to FIG. 1 or 2.

By way of example, FIG. 4 shows a timeline 410 of LBT radio frames transmitted by a first base station over a shared radio frequency spectrum band, and a timeline 415 of LBT radio frames transmitted by a second base station over a shared radio frequency spectrum band, in relation to a periodic radio frame structure 405 associated with a dedicated radio frequency spectrum band. The dedicated radio frequency spectrum band may be a radio frequency spectrum band for which transmitting apparatuses may not contend for access because the radio frequency spectrum band is licensed to particular users for particular uses (e.g., a licensed radio frequency spectrum band usable for LTE/ LTE-A communications). The shared radio frequency spectrum band may be a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner).

The periodic radio frame structure 405 shown in FIG. 4 includes radio frames designated by SFNs 4, 5, 6, 7, 8, and 9. A resynchronization occasion is provided in each of SFN 4 and SFN 8 (e.g., a first resynchronization occasion 420 is provided in SFN 4, and a second resynchronization occasion 425 is provided in SFN 8).

During the first resynchronization occasion 420, the first base station and the second base station may resynchronize their LBT radio frame timings. After the resynchronization performed during the first resynchronization occasion 420, and when each of the first base station and the second base station have data to transmit or receive, each of the first base station and the second base station may contend for access to the shared radio frequency spectrum band. Because the first base station and the second base station belong to the same PLMN and are synchronized, the first base station and the second base station may both win or both lose contention for access to the shared radio frequency spectrum band. When the first base station and the second base station both win contention for access to the shared radio frequency spectrum band, each of the first base station and the second base station may transmit respective LBT radio frames (e.g., the first base station may transmit the first LBT radio frame 430, and the second base station may transmit the second LBT radio frame 435), at the same time, in a reuse one mode. When the first base station and the second base station both have data to transmit and are able to win contention for access to the shared radio frequency spectrum band for SFN 6, the first base station and the second base station may continue to operate in a reuse one mode. However, in the example shown in FIG. 4, neither the first base station nor the second base station is able to win contention for access to the shared radio frequency spectrum band at the beginning of SFN 6. Upon one or both of the first base station or the second base station failing to win contention for access to the shared radio frequency spectrum band (e.g., because of the activity of other devices using the shared radio frequency spectrum band in the vicinity of the first base station or the second base station), the first base station and the second base station may operate in a TDM mode with respect to accessing the shared radio frequency spectrum band.

By way of example, the first base station is shown to win contention for access to the shared radio frequency spectrum band for an LBT radio frame transmitted/received partway through SFN 6 to partway through SFN 7, and again, for an LBT radio frame transmitted/received partway through SFN 7 to partway through SFN 8. During LBT radio frames in which the first base station wins contention for access to the shared radio frequency spectrum band, the second base station may be prevented from winning contention for access to the shared radio frequency spectrum band. Likewise, during LBT radio frames in which the second base station wins contention for access to the shared radio frequency spectrum band (e.g., during the latter part of SFN 8), the first base station may be prevented from winning contention for access to the shared radio frequency spectrum band.

During the second resynchronization occasion 425, the first base station and the second base station may once again resynchronize their LBT radio frame timings and operate in a reuse one mode.

As described with reference to FIG. 3, the switching of the first base station and the second base station between operation in a reuse one mode and operation in a TDM mode may affect the interference environments of the base stations. For example, when the first base station operates in a reuse one mode with respect to the second base station, downlink transmissions of the first base station may experience interference from transmissions of the second base station (and from other base stations within the same PLMN). However, when the first base station operates in a TDM mode with respect to the second base station, downlink transmissions of the first base station may not experience interference from transmissions of the second base station (or from other base stations within the same PLMN). These different interference environments may cause variations in the link quality of a UE associated with the first base station (e.g., CSI feedback and PDSCH decoding success/ failure may vary).

If the first base station receives feedback on downlink transmissions from a UE and updates a HARQ outer feedback loop or CSI feedback outer loop of the first base station in response to the feedback, regardless of whether the feedback corresponds to a downlink transmission made in a reuse one mode or a TDM mode, the performance of the first base station may be adversely affected. For example, when feedback for a first downlink transmission made in a reuse one mode is used to update a HARQ outer feedback loop or a CSI outer feedback loop before scheduling a second downlink transmission that will be made in a TDM mode, the update of the HARQ outer feedback loop or the CSI outer feedback loop may result in a lower than supported MCS being used for the downlink transmission, which may result in decreased efficiency on the downlink as a result of unused link capacity. When feedback for a first downlink transmission made in a TDM mode is used to update a HARQ outer feedback loop or a CSI outer feedback loop before scheduling a second downlink transmission to be made in a reuse one mode, the update of the HARQ outer feedback loop or the CSI outer feedback loop may result in a higher than supported MCS or rank being used for the downlink transmission, which may result in decreased efficiency on the downlink as a result of a UE's failure to decode the second downlink transmission. The aforementioned decreases in efficiency may be mitigated, in some examples, by classifying feedback received for downlink transmissions based at least in part on interference parameters associated with the downlink transmissions, by identifying interference parameters for downlink transmissions, and by scheduling downlink transmissions based on feedback categories associated with the identified interference parameters for the downlink transmissions, as described for example with reference to FIG. 5, 6, 7, 8, 9, 12, 13, 14, or 15.

Figure 5:
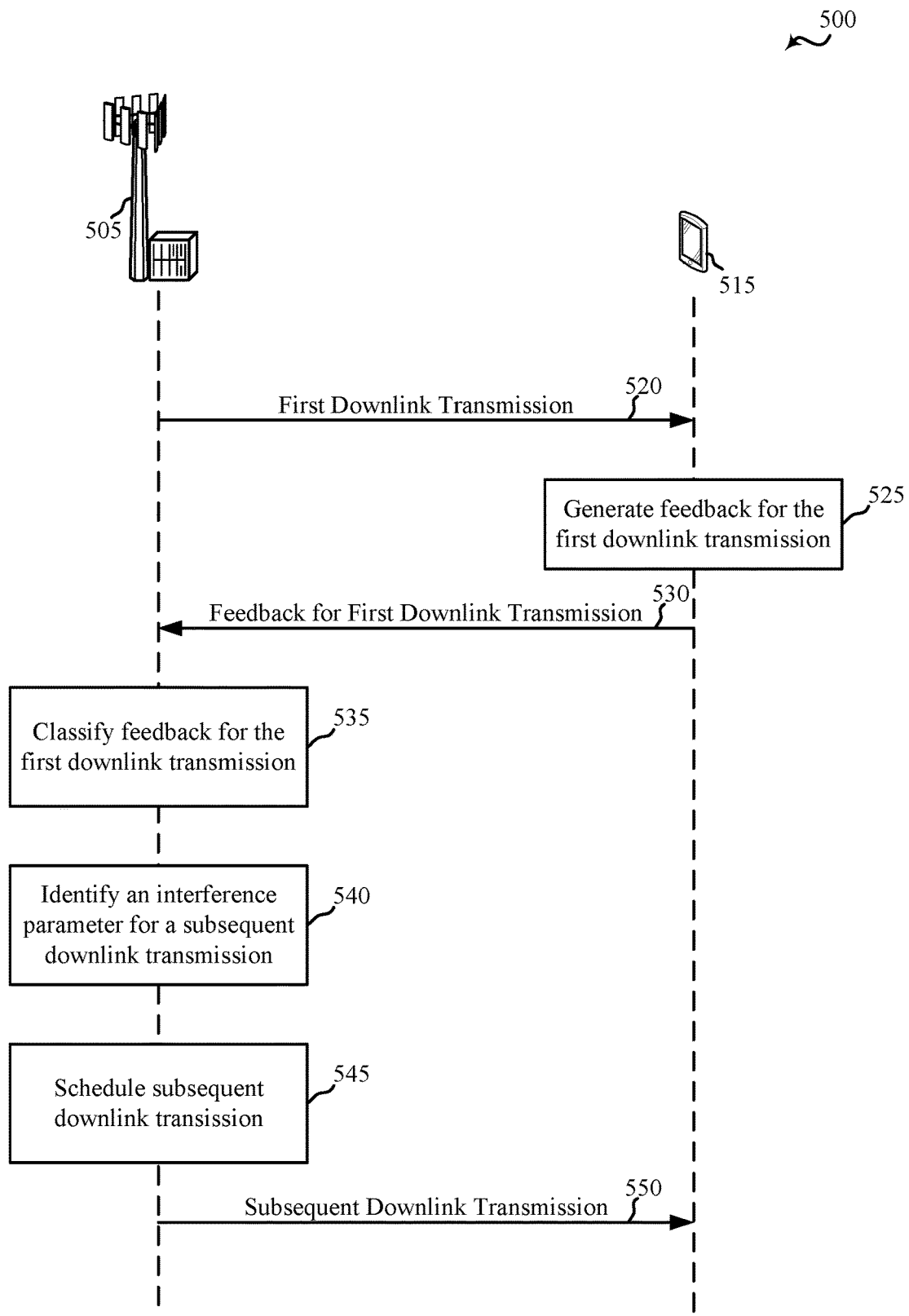
FIG. 5 shows a communication flow between a base station and a UE over a shared radio frequency spectrum band, in accordance with various aspects of the present disclosure.

FIG. 5 shows a communication flow 500 between a base station 505 and a UE 515 over a shared radio frequency spectrum band, in accordance with various aspects of the present disclosure. The base station 505 and UE 515 may be examples of aspects of the base stations 105, 205, or 205-a or UEs 115, 215, 215-a, 215-b, or 215-c described with reference to FIG. 1 or 2.

The communication flow 500 may begin with the base station 505 transmitting a first downlink transmission 520 to the UE 515. At block 525, upon receiving the first downlink transmission 520, the UE 515 may generate feedback 530 for the first downlink transmission 520. The feedback 530 may be transmitted to the base station 505.

At block 535, the base station 505 may classify the feedback 530 in one of a plurality of feedback categories. The classification may be based at least in part on an interference parameter for the first downlink transmission. In some examples, the interference parameter may include one of transmission in a reuse one mode or transmission in a TDM mode.

At block 540, the base station 505 may identify an interference parameter for a subsequent downlink transmission 550, and at block 545, the base station 505 may schedule the subsequent downlink transmission 550 based at least in part on feedback classified in a feedback category associated with the interference parameter identified at block 535. The subsequent downlink transmission 550 may be transmitted to the UE 515. The classification of feedback for downlink transmissions, and the scheduling of subsequent transmissions based at least in part on feedback classified in feedback categories associated with interference parameters identified for the subsequent transmissions, may improve the efficiency of downlink transmissions by enabling the selection of appropriate MCSs for downlink transmissions associated with different interference parameters.

Figure 6:
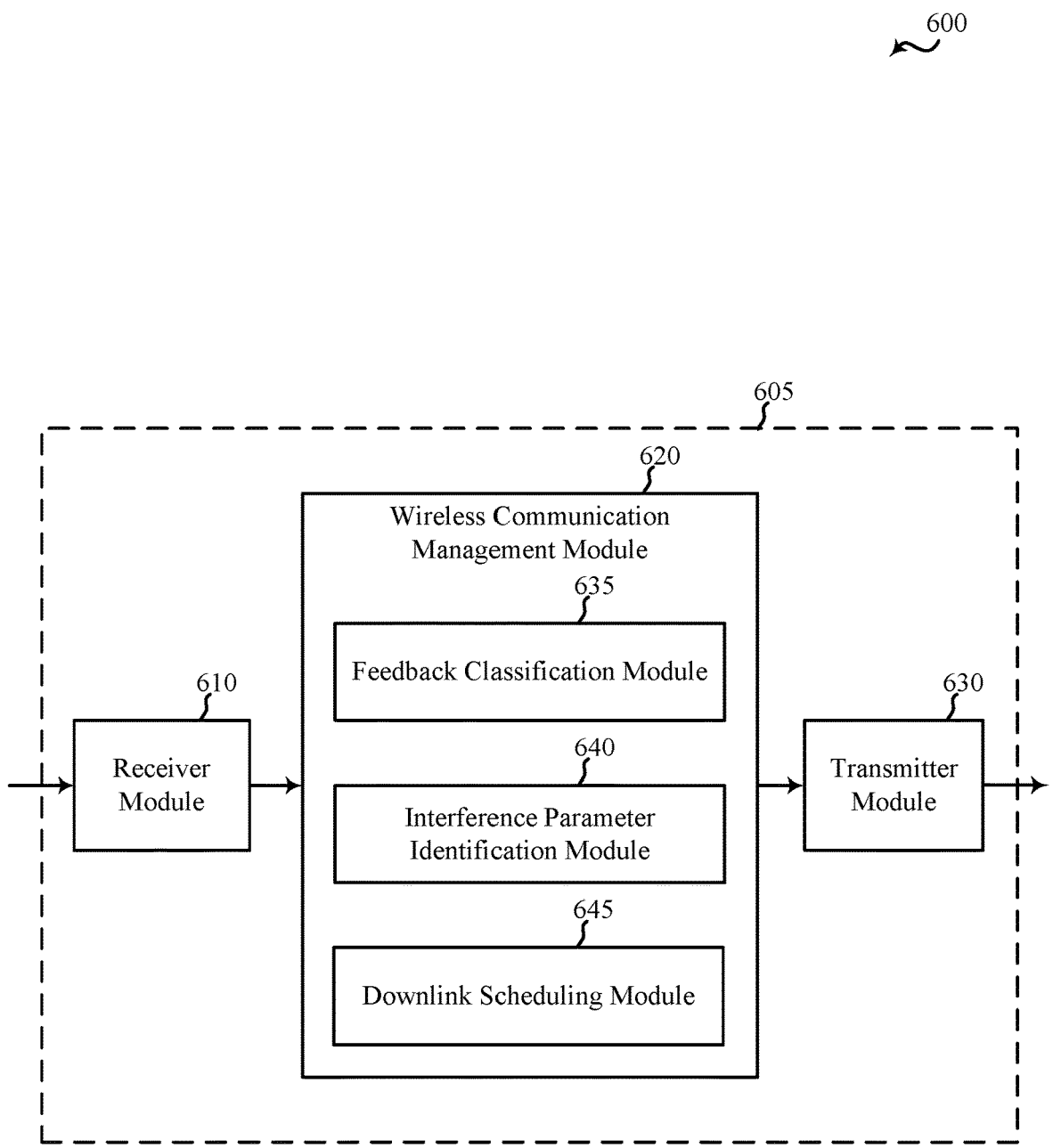
FIG. 6 shows a block diagram of an apparatus for use in wireless communication, in accordance with various aspects of the present disclosure.

FIG. 6 shows a block diagram 600 of an apparatus 605 for use in wireless communication, in accordance with various aspects of the present disclosure. The apparatus 605 may be an example of aspects of one or more of the base stations 105, 205, 205-a, or 505 described with reference to FIG. 1, 2, or 5. The apparatus 605 may also be or include a processor. The apparatus 605 may include a receiver module 610, a wireless communication management module 620, or a transmitter module 630. Each of these modules may be in communication with each other.

The modules of the apparatus 605 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System on Chip (SoC), or other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 610 may include at least one radio frequency (RF) receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, or 5. The receiver module 610 may be used to receive various types of data or control signals (i.e., transmissions) over one or more communication links of a wireless communication system, such as one or more communication links of the wireless communication systems 100 or 200 described with reference to FIG. 1 or 2. The communication links may be established over the first radio frequency spectrum band or the second radio frequency spectrum band.

In some examples, the transmitter module 630 may include at least one RF transmitter, such as at least one RF transmitter operable to transmit over the dedicated radio frequency spectrum band or the shared radio frequency spectrum band. The transmitter module 630 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication management module 620 may be used to manage one or more aspects of wireless communication for the apparatus 605, including the transmission of downlink transmissions (e.g., a first downlink transmission or a subsequent downlink transmission) via the transmitter module 630 over the shared radio frequency spectrum band, and the receipt of feedback for the downlink transmissions via the receiver module 610 over the shared radio frequency spectrum band. In some examples, the wireless communication management module 620 may include a feedback classification module 635, an interference parameter identification module 640, or a downlink scheduling module 645. In some examples, portions of the wireless communication management module 620 may be incorporated into the receiver module 610 or the transmitter module 630.

In some examples, the feedback classification module 635 may be used to classify feedback received for the first downlink transmission over the shared radio frequency spectrum band. The feedback may be classified in one of a plurality of feedback categories, and may be based at least in part on an interference parameter for the first downlink transmission. In some examples, the interference parameter for the first downlink transmission may include one of transmission in a reuse one mode or transmission in a TDM mode. In some examples, the feedback received for the first downlink transmission may include CSI, ACK/NACK feedback, or a combination thereof.

In some examples, the interference parameter identification module 640 may be used to identify an interference parameter for the subsequent downlink transmission.

In some examples, the downlink scheduling module 645 may be used to schedule the subsequent downlink transmission based at least in part on feedback classified in a feedback category associated with the identified interference parameter for the subsequent downlink transmission.

Figure 7:
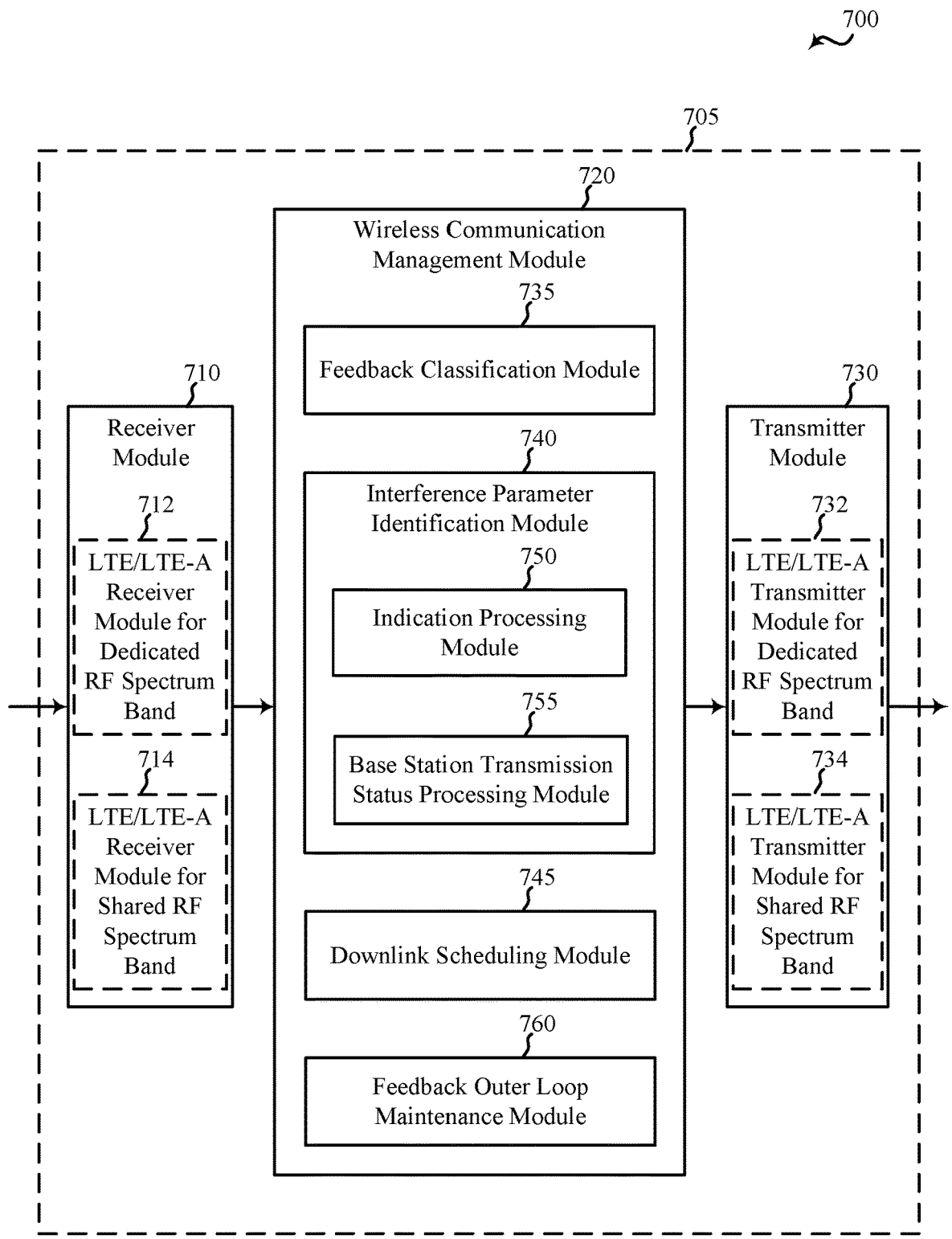
FIG. 7 shows a block diagram of an apparatus for use in wireless communication, in accordance with various aspects of the present disclosure.

FIG. 7 shows a block diagram 700 of an apparatus 705 for use in wireless communication, in accordance with various aspects of the present disclosure. The apparatus 705 may be an example of aspects of one or more of the base stations 105, 205, 205-a, or 505 described with reference to FIG. 1, 2, or 5, or aspects of the apparatus 605 described with reference to FIG. 6. The apparatus 705 may also be or include a processor. The apparatus 705 may include a receiver module 710, a wireless communication management module 720, or a transmitter module 730. Each of these modules may be in communication with each other.

The modules of the apparatus 705 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 710 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, or 5. The receiver module 710 may in some cases include separate receivers for the dedicated radio frequency spectrum band and the shared radio frequency spectrum band. The separate receivers may, in some examples, take the form of an LTE/LTE-A receiver module for communicating over the dedicated radio frequency spectrum band (e.g., LTE/LTE-A receiver module for dedicated RF spectrum band 712), and an LTE/LTE-A receiver module for communicating over the shared radio frequency spectrum band (e.g., LTE/LTE-A receiver module for shared RF spectrum band 714). The receiver module 710, including the LTE/LTE-A receiver module for dedicated RF spectrum band 712 or the LTE/LTE-A receiver module for shared RF spectrum band 714, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter module 730 may include at least one RF transmitter, such as at least one RF transmitter operable to transmit over the dedicated radio frequency spectrum band or the shared radio frequency spectrum band. The transmitter module 730 may in some cases include separate transmitters for the dedicated radio frequency spectrum band and the shared radio frequency spectrum band. The separate transmitters may, in some examples, take the form of an LTE/LTE-A transmitter module for communicating over the dedicated radio frequency spectrum band (e.g., LTE/LTE-A transmitter module for dedicated RF spectrum band 732), and an LTE/LTE-A transmitter module for communicating over the shared radio frequency spectrum band (e.g., LTE/LTE-A transmitter module for shared RF spectrum band 734). The transmitter module 730, including the LTE/LTE-A transmitter module for dedicated RF spectrum band 732 or the LTE/LTE-A transmitter module for shared RF spectrum band 734, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication management module 720 may be used to manage one or more aspects of wireless communication for the apparatus 705, including the transmission of downlink transmissions via the transmitter module 730 over the shared radio frequency spectrum band, and the receipt of feedback for the downlink transmissions via the receiver module 710. In some examples, the feedback for the downlink transmissions may include CSI, ACK/NACK feedback, or a combination thereof. In some examples, the wireless communication management module 720 may include a feedback classification module 735, an interference parameter identification module 740, a downlink scheduling module 745, or a feedback outer loop maintenance module 760. In some examples, portions of the wireless communication management module 720 may be incorporated into the receiver module 710 or the transmitter module 730.

The interference parameter identification module 740 may be used to identify an interference parameter for a downlink transmission. In some examples, the interference parameter for the downlink transmission may include one of transmission in a reuse one mode or transmission in a TDM mode. In some examples, the interference parameter identification module 740 may include an indication processing module 750 or a base station transmission status processing module 755. The indication processing module 750 may be used to receive an indication of the interference parameter for a downlink transmission with feedback for the downlink transmission. The base station transmission status processing module 755 may be used to receive a transmission status from at least one other base station and identify the interference parameter for a downlink transmission based at least in part on the transmission status. The transmission status may be a transmission status that existed at a time when the downlink transmission was transmitted. In some examples, the apparatus 705 and the at least one other base station from which a transmission status is received may belong to a same PLMN. In some examples, receiving a transmission status may include receiving a CUBS, or a PFFICH, or a combination thereof.

The feedback classification module 735 may be used to classify feedback received for a downlink transmission in a first feedback category based at least in part on the interference parameter for the downlink transmission including transmission of the downlink transmission in a reuse one mode, or in a second feedback category based at least in part on the interference parameter for the downlink transmission including transmission of the downlink transmission in a TDM mode.

The downlink scheduling module 745 may be used to schedule a downlink transmission (e.g., select an MCS for the downlink transmission) based at least in part on feedback classified in a feedback category associated with the interference parameter identified for the downlink transmission. When the interference parameter identified for the downlink transmission includes transmission in a reuse one mode, the feedback category may be the first feedback category. When the interference parameter identified for the subsequent downlink transmission includes transmission in a TDM mode, the feedback category may be the second feedback category. In some examples, the downlink scheduling module 745 may perform downlink scheduling per subframe.

The feedback outer loop maintenance module 760 may be used to maintain, for each feedback category of the plurality of feedback categories, at least one of a separate HARQ feedback outer loop or a separate CSI feedback outer loop. In some examples, the feedback outer loop maintenance module 760 may skip, upon classifying the feedback received for a downlink transmission in a first feedback category, at least one update of at least one of: a HARQ feedback outer loop associated with a second feedback category or a CSI feedback outer loop associated with the second feedback category. The feedback outer loop maintenance module 760 may also skip, upon classifying the feedback received for a downlink transmission in the second feedback category, at least one update of at least one of: a HARQ feedback outer loop associated with the first feedback category or a CSI feedback outer loop associated with the first feedback category.

In some examples, the downlink scheduling module 745 may be used to schedule a downlink transmission based at least in part on one or both of a HARQ feedback outer loop and a CSI feedback outer loop associated with a feedback category associated with an interference parameter for the downlink transmission.

Figure 8:
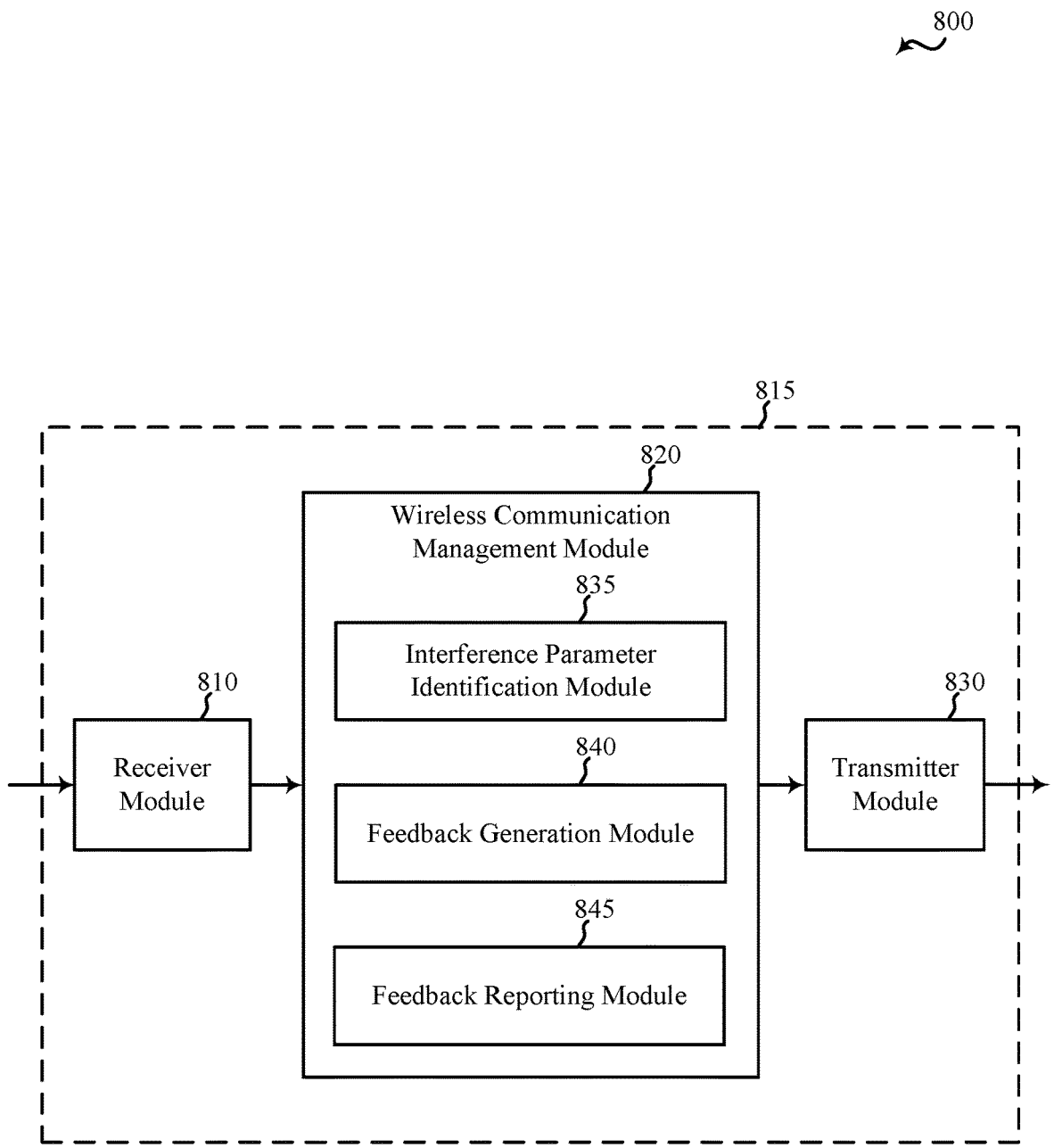
FIG. 8 shows a block diagram of an apparatus for use in wireless communication, in accordance with various aspects of the present disclosure.

FIG. 8 shows a block diagram 800 of an apparatus 815 for use in wireless communication, in accordance with various aspects of the present disclosure. The apparatus 815 may be an example of aspects of one or more of the UEs 115, 215, 215-a, 215-b, 215-c, or 515 described with reference to FIG. 1, 2, or 5. The apparatus 815 may also be or include a processor. The apparatus 815 may include a receiver module 810, a wireless communication management module 820, or a transmitter module 830. Each of these modules may be in communication with each other.

The modules of the apparatus 815 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 810 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, or 5. The receiver module 810 may be used to receive various types of data or control signals (i.e., transmissions) over one or more communication links of a wireless communication system, such as one or more communication links of the wireless communication systems 100 or 200 described with reference to FIG. 1 or 2. The communication links may be established over the first radio frequency spectrum band or the second radio frequency spectrum band.

In some examples, the transmitter module 830 may include at least one RF transmitter, such as at least one RF transmitter operable to transmit over the dedicated radio frequency spectrum band or the shared radio frequency spectrum band. The transmitter module 830 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication management module 820 may be used to manage one or more aspects of wireless communication for the apparatus 815, including the receipt of downlink transmissions via the receiver module 810 over the shared radio frequency spectrum band, and the sending of feedback for the downlink transmissions via the transmitter module 830. In some examples, the wireless communication management module 820 may include an interference parameter identification module 835, a feedback generation module 840, or a feedback reporting module 845. In some examples, portions of the wireless communication management module 820 may be incorporated into the receiver module 810 or the transmitter module 830.

In some examples, the interference parameter identification module 835 may be used to identify an interference parameter for a first downlink transmission received over a shared radio frequency spectrum band. In some examples, the interference parameter for the first downlink transmission may include one of transmission in a reuse one mode or transmission in a TDM mode.

In some examples, the feedback generation module 840 may be used to generate feedback for the first downlink transmission. In some examples, the feedback generated for the first downlink transmission may include CSI, ACK/NACK feedback, or a combination thereof.

In some examples, the feedback reporting module 845 may be used to send the feedback, along with an indication of the interference parameter, to a base station.

Figure 9:
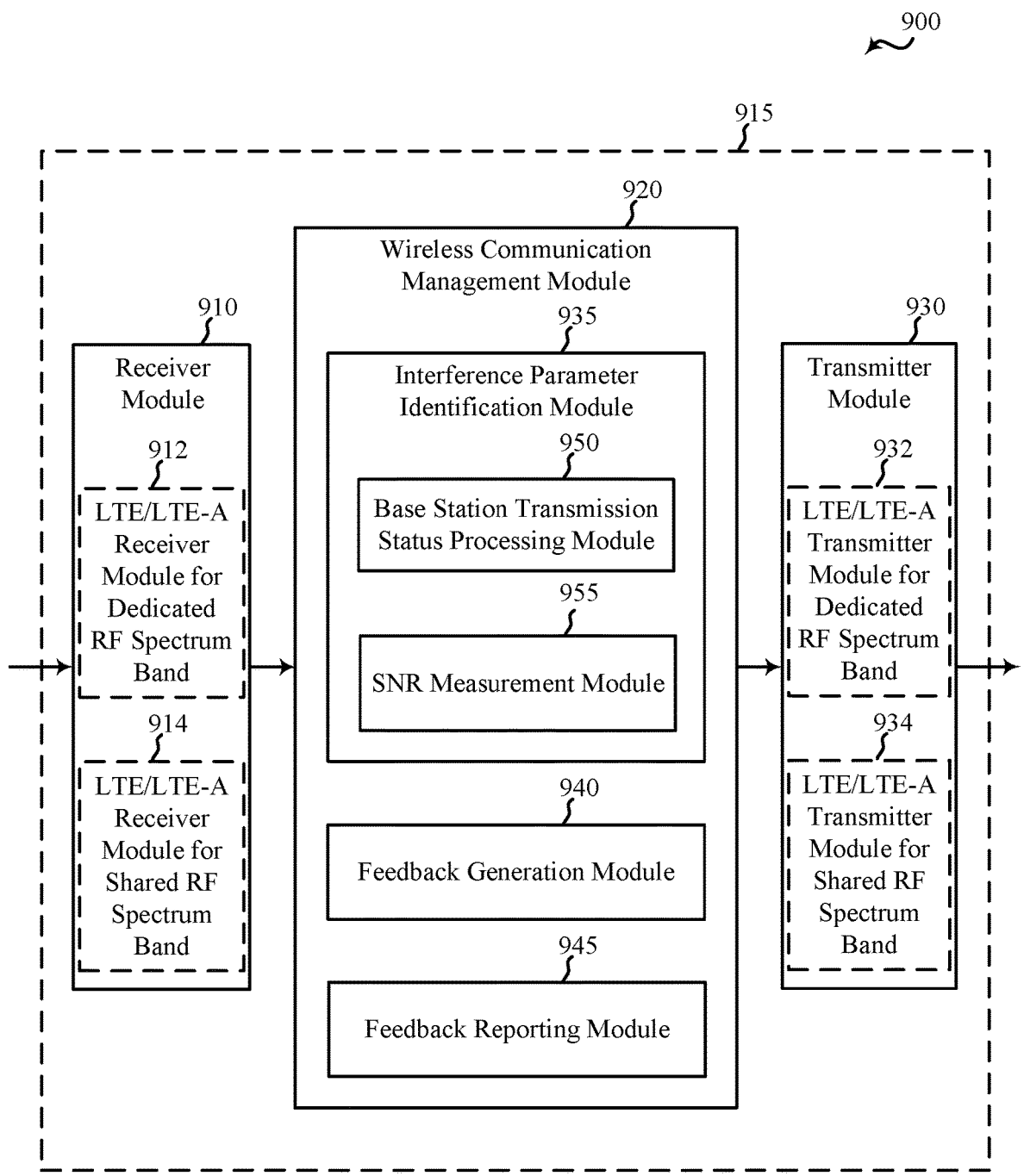
FIG. 9 shows a block diagram of an apparatus for use in wireless communication, in accordance with various aspects of the present disclosure.

FIG. 9 shows a block diagram 900 of an apparatus 915 for use in wireless communication, in accordance with various aspects of the present disclosure. The apparatus 915 may be an example of aspects of one or more of the UEs 115, 215, 215-*a*, 215-*b*, 215-*c*, or 515 described with reference to FIG. 1, 2, or 5, or aspects of the apparatus 815 described with reference to FIG. 8. The apparatus 915 may also be or include a processor. The apparatus 915 may include a receiver module 910, a wireless communication management module 920, or a transmitter module 930. Each of these modules may be in communication with each other.

The modules of the apparatus 915 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 910 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, or 5. The receiver module 910 may in some cases include separate receivers for the dedicated radio frequency spectrum band and the shared radio frequency spectrum band. The separate receivers may, in some examples, take the form of an LTE/LTE-A receiver module for communicating over the dedicated radio frequency spectrum band (e.g., LTE/LTE-A receiver module for dedicated RF spectrum band 912), and an LTE/LTE-A receiver module for communicating over the shared radio frequency spectrum band (e.g., LTE/LTE-A receiver module for shared RF spectrum band 914). The receiver module 910, including the LTE/LTE-A receiver module for dedicated RF spectrum band 912 or the LTE/LTE-A receiver module for shared RF spectrum band 914, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter module 930 may include at least one RF transmitter, such as at least one RF transmitter operable to transmit over the dedicated radio frequency spectrum band or the shared radio frequency spectrum band. The transmitter module 930 may in some cases include separate transmitters for the dedicated radio frequency spectrum band and the shared radio frequency spectrum band. The separate transmitters may, in some examples, take the form of an LTE/LTE-A transmitter module for communicating over the dedicated radio frequency spectrum band (e.g., LTE/LTE-A transmitter module for dedicated RF spectrum band 932), and an LTE/LTE-A transmitter module for communicating over the shared radio frequency spectrum band (e.g., LTE/LTE-A transmitter module for shared RF spectrum band 934). The transmitter module 930, including the LTE/LTE-A transmitter module for dedicated RF spectrum band 932 or the LTE/LTE-A transmitter module for shared RF spectrum band 934, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication management module 920 may be used to manage one or more aspects of wireless communication for the apparatus 915, including the receipt of downlink transmissions via the receiver module 910 over the shared radio frequency spectrum band, and the sending of feedback for the downlink transmissions via the transmitter module 930. In some examples, the wireless communication management module 920 may include an interference parameter identification module 935, a feedback generation module 940, or a feedback reporting module 945. In some examples, portions of the wireless communication management module 920 may be incorporated into the receiver module 910 or the transmitter module 930.

The interference parameter identification module 935 may be used to identify an interference parameter for a first downlink transmission. In some examples, the interference parameter for the first downlink transmission may include one of transmission in a reuse one mode or transmission in a TDM mode. In some examples, the interference parameter identification module 935 may include a base station transmission status processing module 950 or a signal-to-noise ratio (SNR) measurement module 955. The base station transmission status processing module 950 may be used to receive a transmission status from at least one neighboring base station and identify the interference parameter for the first downlink transmission based at least in part on the transmission status. The transmission status may be a transmission status that exists at a time when the first downlink transmission is received. In some example, the apparatus 915 and the at least one neighboring base station may belong to a same PLMN. The SNR measurement module 955 may be used to measure a SNR associated with the first downlink transmission estimate the interference parameter for the first downlink transmission based at least in part on the measured SNR.

The feedback generation module 940 may be used to generate feedback for the first downlink transmission. In some examples, the feedback generated for the first downlink transmission may include CSI, ACK/NACK feedback, or a combination thereof.

The feedback reporting module 945 may be used to send the feedback, along with an indication of the interference parameter, to a base station. In some examples, the feedback reporting module 945 may also send the transmission status from the at least one neighboring base station to the base station with the feedback.

Figure 10:
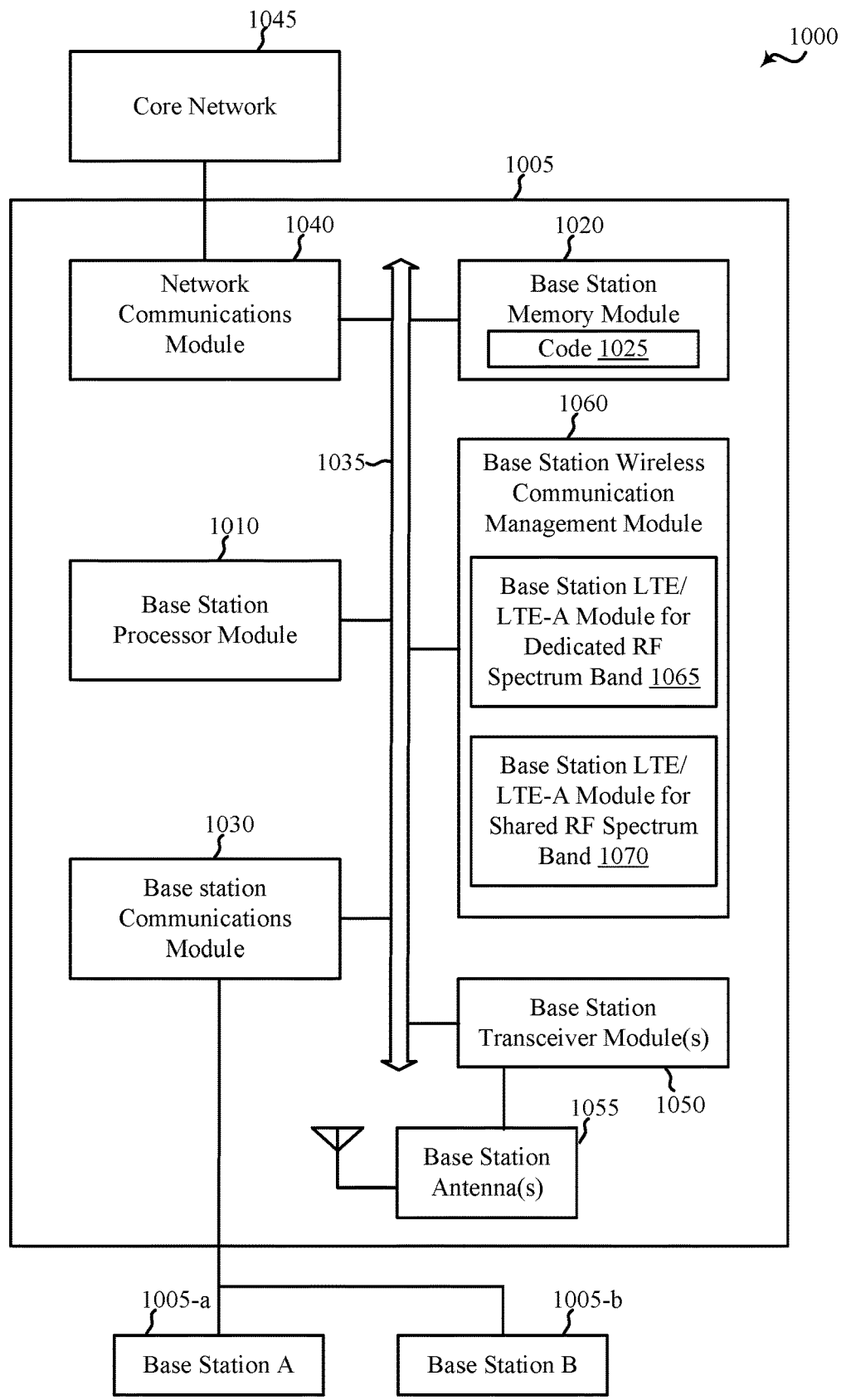
FIG. 10 shows a block diagram of a base station for use in wireless communication, in accordance with various aspects of the present disclosure.

FIG. 10 shows a block diagram 1000 of a base station 1005 (e.g., a base station forming part or all of an eNB) for use in wireless communication, in accordance with various aspects of the present disclosure. In some examples, the base station 1005 may be an example of one or more aspects of the base station 105, 205, 205-*a*, or 505 described with reference to FIG. 1, 2, or 5, or aspects of one or more of the apparatus 605 or 705 described with reference to FIG. 6 or 7. The base station 1005 may be configured to implement or facilitate at least some of the base station features and functions described with reference to FIG. 1, 2, 3, 4, 5, 6, or 7.

The base station 1005 may include a base station processor module 1010, a base station memory module 1020, at least one base station transceiver module (represented by base station transceiver module(s) 1050), at least one base station antenna (represented by base station antenna(s) 1055), or a base station wireless communication management module 1060. The base station 1005 may also include one or more of a base station communications module 1030 or a network communications module 1040. Each of these components may be in communication with each other, directly or indirectly, over one or more buses 1035.

The base station memory module 1020 may include random access memory (RAM) or read-only memory (ROM). The base station memory module 1020 may store computer-readable, computer-executable code 1025 containing instructions that are configured to, when executed, cause the base station processor module 1010 to perform various functions described herein related to wireless communication, including the classification of feedback received for downlink transmissions, and the scheduling of downlink transmissions based at least in part on classified feedback. Alternatively, the code 1025 may not be directly executable by the base station processor module 1010 but be configured to cause the base station 1005 (e.g., when compiled and executed) to perform various of the functions described herein.

The base station processor module 1010 may include an intelligent hardware device, e.g., a CPU, a microcontroller, an ASIC, etc. The base station processor module 1010 may process information received through the base station transceiver module(s) 1050, the base station communications module 1030, or the network communications module 1040. The base station processor module 1010 may also process information to be sent to the transceiver module(s) 1050 for transmission through the antenna(s) 1055, to the base station communications module 1030, for transmission to one or more other base stations 1005-*a* and 1005-*b*, or to the network communications module 1040 for transmission to a core network 1045, which may be an example of one or more aspects of the core network 130 described with reference to FIG. 1. The base station processor module 1010 may handle, alone or in connection with the base station wireless communication management module 1060, various aspects of communicating over (or managing communications over) a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner).

The base station transceiver module(s) 1050 may include a modem configured to modulate packets and provide the modulated packets to the base station antenna(s) 1055 for transmission, and to demodulate packets received from the base station antenna(s) 1055. The base station transceiver module(s) 1050 may, in some examples, be implemented as one or more base station transmitter modules and one or more separate base station receiver modules. The base station transceiver module(s) 1050 may support communications in the dedicated radio frequency spectrum band or the shared radio frequency spectrum band. The base station transceiver module(s) 1050 may be configured to communicate bi-directionally, via the antenna(s) 1755, with one or more UEs or apparatuses, such as one or more of the UEs 115, 215, 215-*a*, 215-*b*, 215-*c*, or 515 described with reference to FIG. 1, 2, or 5, or one or more of the apparatus 815 or 915 described with reference to FIG. 8 or 9. The base station 1005 may, for example, include multiple base station antennas 1055 (e.g., an antenna array). The base station 1005 may communicate with the core network 1045 through the network communications module 1040. The base station 1005 may also communicate with other base stations, such as the base stations 1005-*a* and 1005-*b*, using the base station communications module 1030.

The base station wireless communication management module 1060 may be configured to perform or control some or all of the features or functions described with reference to FIG. 1, 2, 3, 4, 5, 6, or 7 related to wireless communication over the dedicated radio frequency spectrum band or the shared radio frequency spectrum band. For example, the base station wireless communication management module 1060 may be configured to support a supplemental downlink mode (e.g., a licensed assisted access mode), a carrier aggregation mode, or a standalone mode using the dedicated radio frequency spectrum band or the shared radio frequency spectrum band. The base station wireless communication management module 1060 may include a base station LTE/LTE-A module for dedicated RF spectrum band 1065 configured to handle LTE/LTE-A communications in the dedicated radio frequency spectrum band, and a base station LTE/LTE-A module for shared RF spectrum band 1070 configured to handle LTE/LTE-A communications in the shared radio frequency spectrum band. The base station wireless communication management module 1060, or portions of it, may include a processor, or some or all of the functions of the base station wireless communication management module 1060 may be performed by the base station processor module 1010 or in connection with the base station processor module 1010. In some examples, the base station wireless communication management module 1060 may be an example of the wireless communication management module 620 or 720 described with reference to FIG. 6 or 7.

Figure 11:
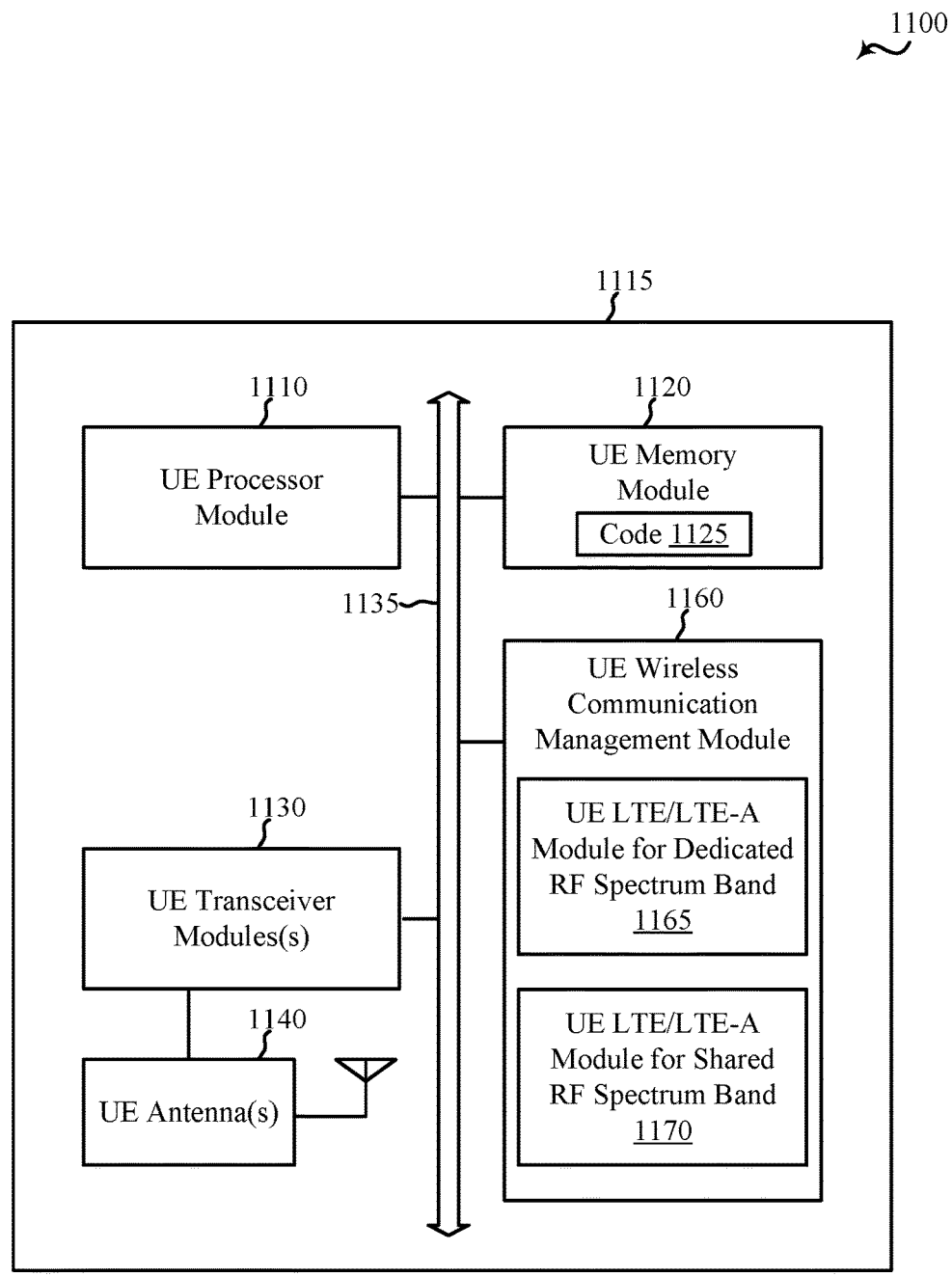
FIG. 11 shows a block diagram of a UE for use in wireless communication, in accordance with various aspects of the present disclosure.

FIG. 11 shows a block diagram 1100 of a UE 1115 for use in wireless communication, in accordance with various aspects of the present disclosure. The UE 1115 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1115 may, in some examples, have an internal power supply (not shown), such as a small battery, to facilitate mobile operation. In some examples, the UE 1115 may be an example of aspects of one or more of the UEs 115, 215, 215-*a*, 215-*b*, 215-*c*, or 515 described with reference to FIG. 1, 2, or 5, or aspects of one or more of the apparatuses 605 or 705 described with reference to FIG. 6 or 7. The UE 1115 may be configured to implement at least some of the UE or apparatus features and functions described with reference to FIG. 1, 2, 3, 4, 5, 8, or 9.

The UE 1115 may include a UE processor module 1110, a UE memory module 1120, at least one UE transceiver module (represented by UE transceiver module(s) 1130), at least one UE antenna (represented by UE antenna(s) 1140), or a UE wireless communication management module 1160. Each of these components may be in communication with each other, directly or indirectly, over one or more buses 1135.

The UE memory module 1120 may include RAM or ROM. The UE memory module 1120 may store computer-readable, computer-executable code 1125 containing instructions that are configured to, when executed, cause the UE processor module 1110 to perform various functions described herein related to wireless communication, including the reporting of feedback for downlink transmissions. Alternatively, the code 1125 may not be directly executable by the UE processor module 1110 but be configured to cause the UE 1115 (e.g., when compiled and executed) to perform various of the functions described herein.

The UE processor module 1110 may include an intelligent hardware device, e.g., a central processing unit (CPU), a microcontroller, an ASIC, etc. The UE processor module 1110 may process information received through the UE transceiver module(s) 1130 or information to be sent to the UE transceiver module(s) 1130 for transmission through the UE antenna(s) 1140. The UE processor module 1110 may handle, alone or in connection with the UE wireless communication management module 1160, various aspects of communicating over (or managing communications over) a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner).

The UE transceiver module(s) 1130 may include a modem configured to modulate packets and provide the modulated packets to the UE antenna(s) 1140 for transmission, and to demodulate packets received from the UE antenna(s) 1140. The UE transceiver module(s) 1130 may, in some examples, be implemented as one or more UE transmitter modules and one or more separate UE receiver modules. The UE transceiver module(s) 1130 may support communications in the licensed radio frequency spectrum band or the unlicensed radio frequency spectrum band. The UE transceiver module(s) 1130 may be configured to communicate bi-directionally, via the UE antenna(s) 1140, with one or more of the base stations 105, 205, 205-*a*, 505, or 1005 described with reference to FIG. 1, 2, 5, or 10, or one or more of the apparatuses 605 or 705 described with reference to FIG. 6 or 7. While the UE 1115 may include a single UE antenna, there may be examples in which the UE 1115 may include multiple UE antennas 1140.

The UE wireless communication management module 1160 may be configured to perform or control some or all of the UE or apparatus features or functions described with reference to FIG. 1, 2, 3, 4, 5, 8, or 9 related to wireless communication over the dedicated radio frequency spectrum band or the shared radio frequency spectrum band. For example, the UE wireless communication management module 1160 may be configured to support a supplemental downlink mode (e.g., a licensed assisted access mode), a carrier aggregation mode, or a standalone mode using the dedicated radio frequency spectrum band or the shared radio frequency spectrum band. The UE wireless communication management module 1160 may include a UE LTE/LTE-A module for dedicated RF spectrum band 1165 configured to handle LTE/LTE-A communications in the dedicated radio frequency spectrum band, and a UE LTE/LTE-A module for shared RF spectrum band 1170 configured to handle LTE/LTE-A communications in the shared radio frequency spectrum band. The UE wireless communication management module 1160, or portions of it, may include a processor, or some or all of the functions of the UE wireless communication management module 1160 may be performed by the UE processor module 1110 or in connection with the UE processor module 1110. In some examples, the UE wireless communication management module 1160 may be an example of the wireless communication management module 820 or 920 described with reference to FIG. 8 or 9.

Figure 12:
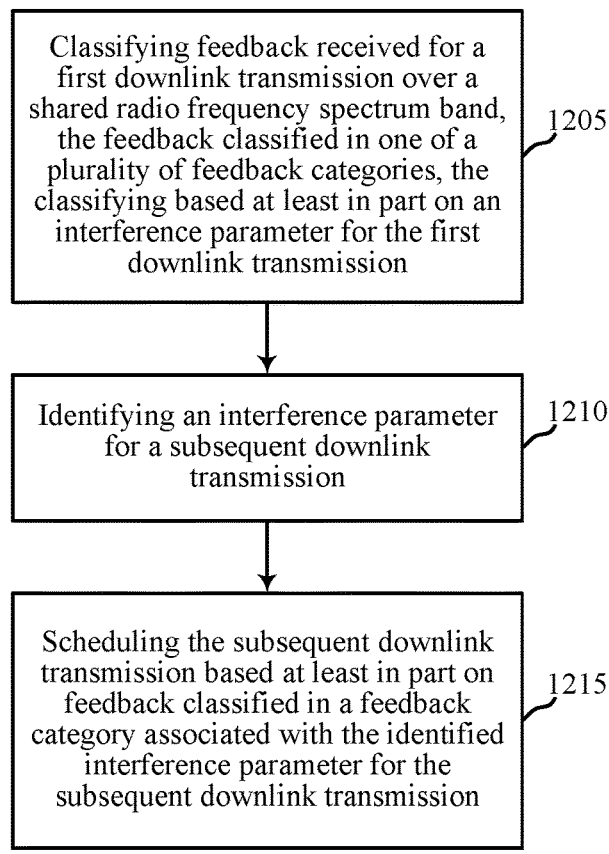
FIG. 12 is a flow chart illustrating an exemplary method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the base stations 105, 205, 205-*a*, 505, or 1005 described with reference to FIG. 1, 2, 5, or 10, or aspects of the apparatus 605 or 705 described with reference to FIG. 6 or 7. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1205, the method 1200 may include classifying feedback received for a first downlink transmission over a shared radio frequency spectrum band. The feedback may be classified in one of a plurality of feedback categories, and may be based at least in part on an interference parameter for the first downlink transmission. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner).

In some examples, the interference parameter for the first downlink transmission may include one of transmission in a reuse one mode or transmission in a TDM mode. In some examples, the feedback received for the first downlink transmission may include CSI, ACK/NACK feedback, or a combination thereof. The operation(s) at block 1205 may be performed using the wireless communication management module 620 or 1060 described with reference to FIG. 6, 7, or 10, or the feedback classification module 635 described with reference to FIG. 6 or 7.

At block 1210, the method 1200 may include identifying an interference parameter for a subsequent downlink transmission. The operation(s) at block 1210 may be performed using the wireless communication management module 620 or 1060 described with reference to FIG. 6, 7, or 10, or the interference parameter identification module 640 described with reference to FIG. 6 or 7.

At block 1215, the method 1200 may include scheduling the subsequent downlink transmission based at least in part on feedback classified in a feedback category associated with the identified interference parameter for the subsequent downlink transmission. The operation(s) at block 1215 may be performed using the wireless communication management module 620 or 1060 described with reference to FIG. 6, 7, or 10, or the downlink scheduling module 645 described with reference to FIG. 6 or 7.

Thus, the method 1200 may provide for wireless communication. It should be noted that the method 1200 is just one implementation and that the operations of the method 1200 may be rearranged or otherwise modified such that other implementations are possible.

Figure 13:
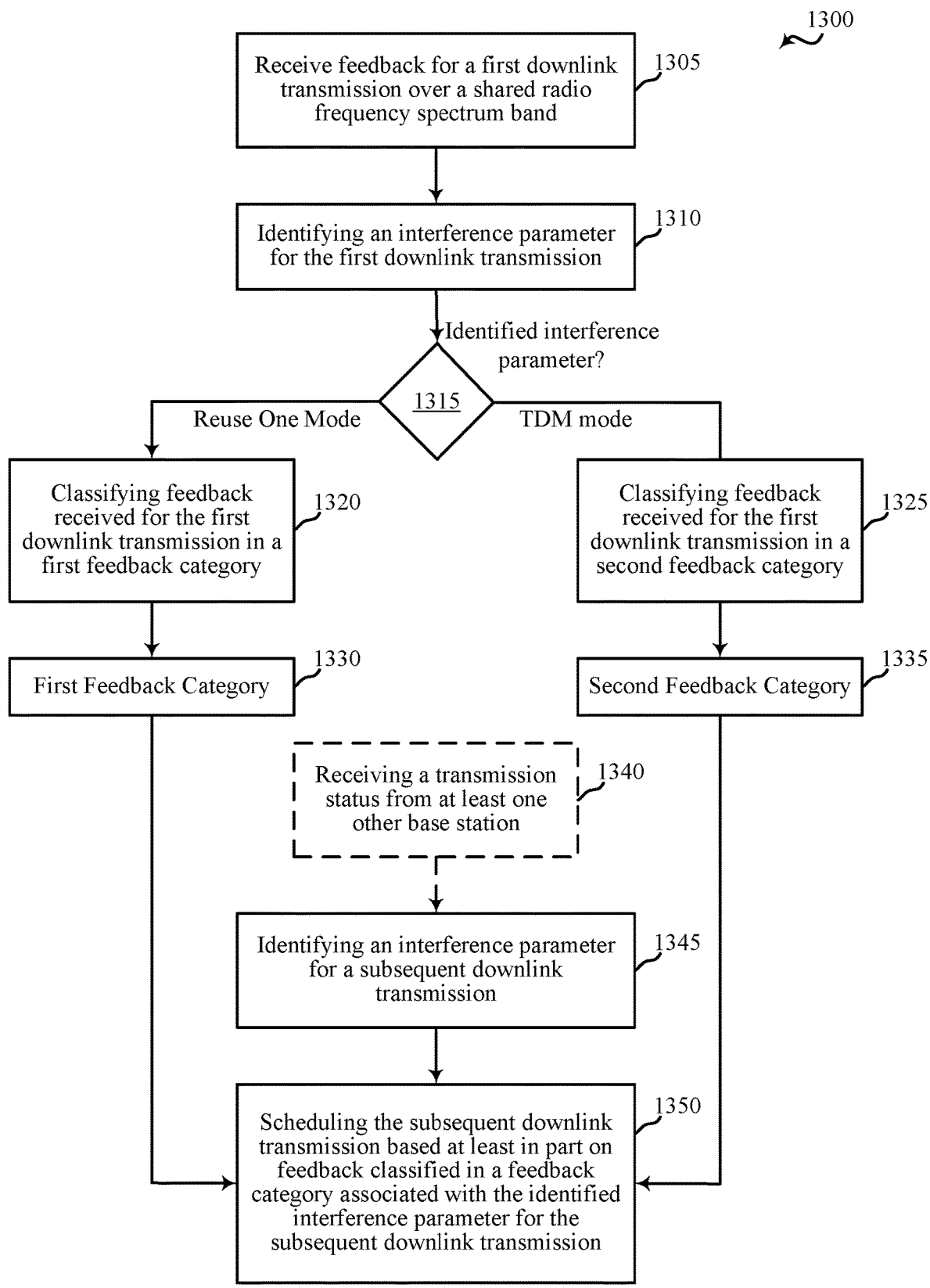
FIG. 13 is a flow chart illustrating an exemplary method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the base stations 105, 205, 205-*a*, 505, or 1005 described with reference to FIG. 1, 2, 5, or 10, or aspects of the apparatus 605 or 705 described with reference to FIG. 6 or 7. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1305, the method 1300 may include receiving feedback for a first downlink transmission over a shared radio frequency spectrum band. In some examples, the feedback received for the first downlink transmission may include CSI, ACK/NACK feedback, or a combination thereof. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 1305 may be performed using the wireless communication management module 620 or 1060 described with reference to FIG. 6, 7, or 10, the receiver module 610 or 710 described with reference to FIG. 6 or 7, or the base station transceiver module(s) 1050 described with reference to FIG. 10.

At block 1310, the method 1300 may include identifying an interference parameter for the first downlink transmission. In some examples, the interference parameter for the first downlink transmission may include one of transmission in a reuse one mode or transmission in a TDM mode. In some examples, identifying the interference parameter for the first downlink transmission may include receiving an indication of the interference parameter with the feedback for the first downlink transmission. In some examples, identifying the interference parameter for the first downlink transmission may include receiving a transmission status from at least one other base station, and identifying the interference parameter for the first downlink transmission based at least in part on the transmission status. The transmission status may be a transmission status that existed at a time when the first downlink transmission was transmitted. In some example, the base station or apparatus performing the method 1300 and the at least one other base station from which a transmission status is received may belong to a same PLMN. In some examples, receiving a transmission status may include receiving a CUBS, or a PFFICH, or a combination thereof. The operation(s) at block 1310 may be performed using the wireless communication management module 620 or 1060 described with reference to FIG. 6, 7, or 10, the interference parameter identification module 640 described with reference to FIG. 6 or 7, or the indication processing module 750 or base station transmission status processing module 755 described with reference to FIG. 7.

At block 1315, the method 1300 may branch to block 1320 or 1325 based at least in part on the interference parameter for the first downlink transmission. When the interference parameter includes transmission in a reuse one mode, the method 1300 may continue at block 1320. When the interference parameter includes transmission in a TDM mode, the method 1300 may continue at block 1325.

At block 1320, the method 1300 may include classifying feedback received for the first downlink transmission in a first feedback category 1330 based at least in part on the interference parameter for the first downlink transmission including transmission of the first downlink transmission in a reuse one mode. At block 1325, the method 1300 may include classifying feedback received for the first downlink transmission in a second feedback category 1335 based at least in part on the interference parameter for the first downlink transmission including transmission of the first downlink transmission in a TDM mode.

In some examples, the method 1300 may include maintaining, for each feedback category of the plurality of feedback categories, at least one of a separate HARQ feedback outer loop or a separate CSI feedback outer loop.

The operation(s) at block 1315, 1320, or 1325 may be performed using the wireless communication management module 620 or 1060 described with reference to FIG. 6, 7, or 10, or the feedback classification module 635 described with reference to FIG. 6 or 7. The maintenance of feedback outer loops may be performed using the wireless communication management module 620 or 1060 described with reference to FIG. 6, 7, or 10, or the feedback outer loop maintenance module 760 described with reference to FIG. 7. In some examples, the operation(s) at block 1305, 1310, 1315, 1320, or 1325 may be performed for each of a plurality of downlink transmissions.

At block 1340, the method 1300 may optionally include receiving a transmission status from at least one other base station. In some example, the base station or apparatus performing the method 1300 and the at least one other base station may belong to a same PLMN. In some examples, receiving a transmission status may include receiving a CUBS, or a PFFICH, or a combination thereof. The operation(s) at block 1340 may be performed using the wireless communication management module 620 or 1060 described with reference to FIG. 6, 7, or 10, the interference parameter identification module 640 or 740 described with reference to FIG. 6 or 7, or the base station transmission status processing module 755 described with reference to FIG. 7.

At block 1345, the method 1300 may include identifying an interference parameter for a subsequent downlink transmission. In some examples, the interference parameter for the subsequent downlink transmission may include one of transmission in a reuse one mode or transmission in a TDM mode. In some examples, identifying the interference parameter for the subsequent downlink transmission may include identifying the interference parameter for the subsequent downlink transmission based at least in part on the transmission status received at block 1340. The transmission status may be a transmission status that exists at a time when the subsequent downlink transmission is transmitted. In some example, the base station or apparatus performing the method 1300 and the at least one other base station may belong to a same PLMN. The operation(s) at block 1345 may be performed using the wireless communication management module 620 or 1060 described with reference to FIG. 6, 7, or 10, the interference parameter identification module 640 described with reference to FIG. 6 or 7, or the indication processing module 750 or base station transmission status processing module 755 described with reference to FIG. 7.

At block 1350, the method 1300 may include scheduling the subsequent downlink transmission (e.g., selecting an MCS for the subsequent downlink transmission) based at least in part on feedback classified in a feedback category associated with the interference parameter identified for the subsequent downlink transmission at block 1345. When the interference parameter identified for the subsequent downlink transmission includes transmission in a reuse one mode, the feedback category may be the first feedback category 1330. When the interference parameter identified for the subsequent downlink transmission includes transmission in a TDM mode, the feedback category may be the second feedback category 1335. In some examples, the scheduling may be performed per subframe. The operation(s) at block 1350 may be performed using the wireless communication management module 620 or 1060 described with reference to FIG. 6, 7, or 10, or the downlink scheduling module 645 described with reference to FIG. 6 or 7.

In some examples of the method 1300, the subsequent downlink transmission may be scheduled based at least in part on one or both of a HARQ feedback outer loop and a CSI feedback outer loop associated with the feedback category associated with the interference parameter for the subsequent downlink transmission.

In some examples, the method 1300 may include skipping, upon classifying the feedback received for the first downlink transmission in the first feedback category, at least one update of at least one of: a HARQ feedback outer loop associated with the second feedback category or a CSI feedback outer loop associated with the second feedback category. The method 1300 may also include skipping, upon classifying the feedback received for the first downlink transmission in the second feedback category, at least one update of at least one of: a HARQ feedback outer loop associated with the first feedback category or a CSI feedback outer loop associated with the first feedback category.

Thus, the method 1300 may provide for wireless communication. It should be noted that the method 1300 is just one implementation and that the operations of the method 1300 may be rearranged or otherwise modified such that other implementations are possible.

Figure 14:
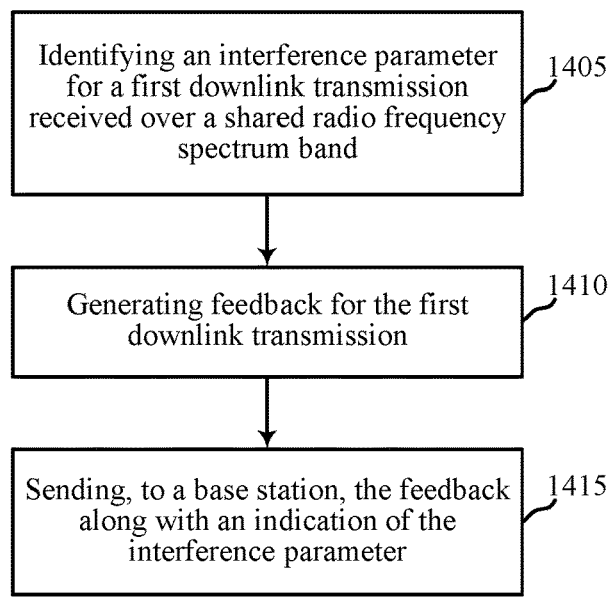
FIG. 14 is a flow chart illustrating an exemplary method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the UEs 115, 215, 215-*a*, 215-*b*, 215-*c*, 515, or 1115 described with reference to FIG. 1, 2, 5, or 11, or aspects of the apparatus 815 or 915 described with reference to FIG. 8 or 9. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1405, the method 1400 may include identifying an interference parameter for a first downlink transmission received over a shared radio frequency spectrum band. In some examples, the interference parameter for the first downlink transmission may include one of transmission in a reuse one mode or transmission in a TDM mode. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 1405 may be performed using the wireless communication management module 820 or 1160 described with reference to FIG. 8, 9, or 11, or the interference parameter identification module 835 described with reference to FIG. 8 or 9.

At block 1410, the method 1400 may include generating feedback for the first downlink transmission. In some examples, the feedback generated for the first downlink transmission may include CSI, ACK/NACK feedback, or a combination thereof. The operation(s) at block 1410 may be performed using the wireless communication management module 820 or 1160 described with reference to FIG. 8, 9, or 11, or the feedback generation module 840 described with reference to FIG. 8 or 9.

At block 1415, the method 1400 may include sending the feedback, along with an indication of the interference parameter, to a base station. The operation(s) at block 1415 may be performed using the wireless communication management module 820 or 1160 described with reference to FIG. 8, 9, or 11, or the feedback reporting module 845 described with reference to FIG. 8 or 9.

Thus, the method 1400 may provide for wireless communication. It should be noted that the method 1400 is just one implementation and that the operations of the method 1400 may be rearranged or otherwise modified such that other implementations are possible.

Figure 15:
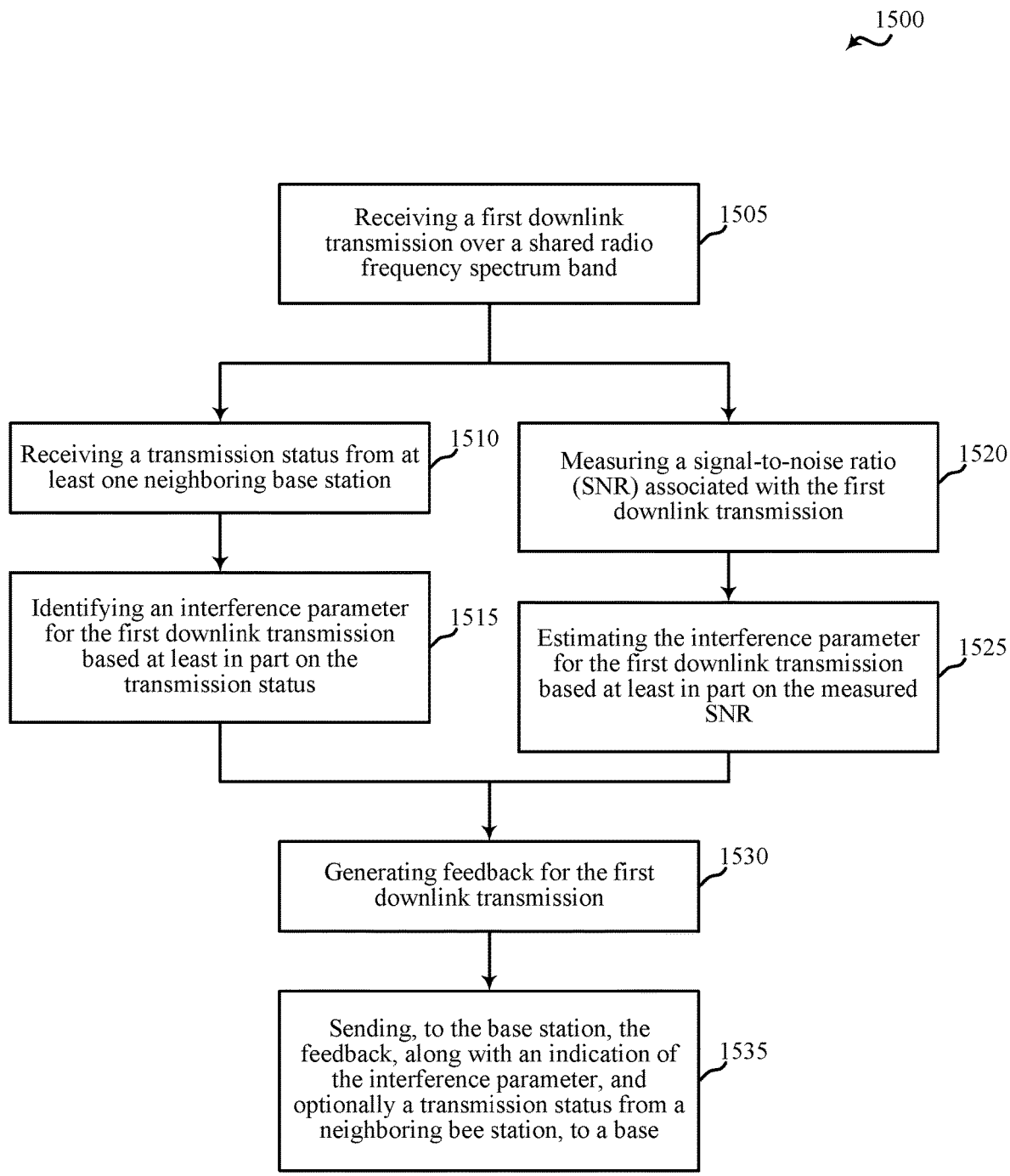
FIG. 15 is a flow chart illustrating an exemplary method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the UEs 115, 215, 215-*a*, 215-*b*, 215-*c*, 515, or 1115 described with reference to FIG. 1, 2, 5, or 11, or aspects of the apparatus 815 or 915 described with reference to FIG. 8 or 9. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1505, the method 1500 may include receiving a first downlink transmission over a shared radio frequency spectrum band. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). The operation(s)

at block 1505 may be performed using the wireless communication management module 820 or 1160 described with reference to FIG. 8, 9, or 11, the receiver module 810 or 910 described with reference to FIG. 8 or 9, or the UE transceiver module(s) 1130 described with reference to FIG. 11.

At blocks 1510 and 1515, or alternatively blocks 1520 and 1525, the method 1500 may include identifying an interference parameter for the first downlink transmission. In some examples, the interference parameter for the first downlink transmission may include one of transmission in a reuse one mode or transmission in a TDM mode. At block 1510, the method 1500 may include receiving a transmission status from at least one neighboring base station, and at block 1515, the method 1500 may include identifying the interference parameter for the first downlink transmission based at least in part on the transmission status. The transmission status may be a transmission status that exists at a time when the first downlink transmission is received. In some example, the UE or apparatus performing the method 1500 and the at least one neighboring base station may belong to a same PLMN. At block 1520, the method 1500 may include measuring a SNR associated with the first downlink transmission, and at block 1525, the method 1500 may include estimating the interference parameter for the first downlink transmission based at least in part on the measured SNR. The operation(s) at block 1510, 1515, 1520, or 1525 may be performed using the wireless communication management module 820 or 1160 described with reference to FIG. 8, 9, or 11, the interference parameter identification module 835 described with reference to FIG. 8 or 9, or the base station transmission status processing module 950 or SNR measurement module 955 described with reference to FIG. 9.

At block 1530, the method 1500 may include generating feedback for the first downlink transmission. In some examples, the feedback generated for the first downlink transmission may include CSI, ACK/NACK feedback, or a combination thereof. The operation(s) at block 1530 may be performed using the wireless communication management module 820 or 1160 described with reference to FIG. 8, 9, or 11, or the feedback generation module 840 described with reference to FIG. 8 or 9.

At block 1535, the method 1500 may include sending the feedback, along with an indication of the interference parameter, to a base station. In some examples, the transmission status from the at least one neighboring base station may also be sent to the base station with the feedback. The operation(s) at block 1535 may be performed using the wireless communication management module 820 or 1160 described with reference to FIG. 8, 9, or 11, or the feedback reporting module 845 described with reference to FIG. 8 or 9.

Thus, the method 1500 may provide for wireless communication. It should be noted that the method 1500 is just one implementation and that the operations of the method 1500 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may include RAM, ROM, EEPROM, flash memory, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication at a user equipment (UE), comprising:
   receiving a downlink transmission;
   identifying an interference parameter for the downlink transmission, wherein the interference parameter comprises a transmission mode, the transmission mode comprising one of transmission in a reuse one mode or transmission in a time domain multiplexed mode;
   generating feedback for the downlink transmission based at least in part on receiving the downlink transmission; and
   transmitting a feedback signal, the feedback signal comprising the feedback for the downlink transmission and an indication of the interference parameter for the downlink transmission.

2. The method of claim 1, wherein identifying the interference parameter comprises:
   receiving a transmission status from at least one neighboring base station; and
   identifying the interference parameter for the downlink transmission based at least in part on the transmission status.

3. The method of claim 2, wherein receiving the transmission status comprises:
   receiving the transmission status that exists when the downlink transmission is received.

4. The method of claim 2, further comprising:
   transmitting the transmission status received from the at least one neighboring base station in the feedback signal.

5. The method of claim 1, wherein identifying the interference parameter comprises:
   measuring a signal-to-noise ratio associated with the downlink transmission; and
   estimating the interference parameter for the downlink transmission based at least in part on the measured signal-to-noise ratio.

6. The method of claim 1, wherein generating the feedback for the downlink transmission comprises:
   generating channel state information, acknowledgement feedback, negative acknowledgement feedback, or a combination thereof.

7. An apparatus for wireless communication at a user equipment (UE), comprising:
   a processor; and
   memory coupled to the processor, wherein the processor is configured to:
   receive a downlink transmission;
   identify an interference parameter for the downlink transmission, wherein the interference parameter comprises a transmission mode, the transmission mode comprising one of transmission in a reuse one mode or transmission in a time domain multiplexed mode;
   generate feedback for the downlink transmission based at least in part on receiving the downlink transmission; and
   transmit a feedback signal, the feedback signal comprising the feedback for the downlink transmission and an indication of the interference parameter for the downlink transmission.

8. The apparatus of claim 7, wherein the processor is configured to:
   receive a transmission status from at least one neighboring base station; and
   identify the interference parameter for the downlink transmission based at least in part on the transmission status.

9. The apparatus of claim 8, wherein the processor is configured to:
   receive the transmission status that exists when the downlink transmission is received.

10. The apparatus of claim 8, wherein the processor is configured to:
    transmit the transmission status received from the at least one neighboring base station in the feedback signal.

11. The apparatus of claim 7, wherein the processor is configured to:
    measure a signal-to-noise ratio associated with the downlink transmission; and
    estimate the interference parameter for the downlink transmission based at least in part on the measured signal-to-noise ratio.

12. The apparatus of claim 7, wherein to generate the feedback for the downlink transmission, the processor is further configured to:
    generate channel state information, acknowledgement feedback, negative acknowledgement feedback, or a combination thereof.

13. An apparatus for wireless communication at a user equipment (UE), comprising:
    means for receiving a downlink transmission;
    means for identifying an interference parameter for the downlink transmission, wherein the interference parameter comprises a transmission mode, the transmission mode comprising one of transmission in a reuse one mode or transmission in a time domain multiplexed mode;
    means for generating feedback for the downlink transmission based at least in part on receiving the downlink transmission; and
    means for transmitting a feedback signal, the feedback signal comprising the feedback for the downlink transmission and an indication of the interference parameter for the downlink transmission.

14. The apparatus of claim 13, wherein the means for identifying the interference parameter comprises:
    means for receiving a transmission status from at least one neighboring base station; and
    means for identifying the interference parameter for the downlink transmission based at least in part on the transmission status.

15. The apparatus of claim 14, further comprising:
    means for transmitting the transmission status received from the at least one neighboring base station in the feedback signal.

16. The apparatus of claim 13, wherein identifying the interference parameter comprises:
    means for measuring a signal-to-noise ratio associated with the downlink transmission; and
    means for estimating the interference parameter for the downlink transmission based at least in part on the measured signal-to-noise ratio.

17. The apparatus of claim 13, wherein the means for generating the feedback for the downlink transmission comprises:
    means for generating channel state information, acknowledgement feedback, negative acknowledgement feedback, or a combination thereof.

* * * * *